United States Patent
Mitsuoka et al.

(10) Patent No.: US 9,595,703 B2
(45) Date of Patent: Mar. 14, 2017

(54) POLYETHYLENE MICROPOROUS MEMBRANE AND PROCESS FOR MANUFACTURING SAME

(71) Applicant: Toray Battery Separator Film Co., Ltd., Nasushiobara (JP)

(72) Inventors: Hideto Mitsuoka, Nasushiobara (JP); Shintaro Kikuchi, Nasushiobara (JP); Kazuhiro Yamada, Nasushiobara (JP)

(73) Assignee: Toray Battery Separator Film Co., Ltd. (JP)

( * ) Notice: Subject to any disclaimer, the term of this patent is extended or adjusted under 35 U.S.C. 154(b) by 102 days.

(21) Appl. No.: 14/384,316

(22) PCT Filed: Mar. 22, 2013

(86) PCT No.: PCT/JP2013/058283
§ 371 (c)(1),
(2) Date: Sep. 10, 2014

(87) PCT Pub. No.: WO2013/146585
PCT Pub. Date: Oct. 3, 2013

(65) Prior Publication Data
US 2015/0030907 A1    Jan. 29, 2015

(30) Foreign Application Priority Data
Mar. 30, 2012   (JP) .................................. 2012-082218

(51) Int. Cl.
H01M 2/16 (2006.01)
B29D 7/01 (2006.01)
B29C 47/00 (2006.01)
C08J 9/28 (2006.01)
C08J 9/36 (2006.01)
H01M 2/14 (2006.01)
B29K 23/00 (2006.01)
(Continued)

(52) U.S. Cl.
CPC ....... H01M 2/1686 (2013.01); B29C 47/0021 (2013.01); B29D 7/01 (2013.01);
(Continued)

(58) Field of Classification Search
CPC .. H01M 2/145; H01M 2/1653; H01M 2/1686; B29C 47/0021; B29D 7/01;
(Continued)

(56) References Cited

U.S. PATENT DOCUMENTS

2009/0146334 A1    6/2009   Takita et al.
2009/0246613 A1   10/2009   Park et al.
2014/0159271 A1*   6/2014   Itou .................... H01M 2/1653
                                                             264/48

FOREIGN PATENT DOCUMENTS

EP    2 612 702    7/2013
JP    04-286624   10/1995
(Continued)

OTHER PUBLICATIONS

K. Matsumoto, et al., "Behavior of Crystalline Orientation and the Mechanical Properties of the Biaxially Stretched Polypropylene Films Prepared by Dry-Process," *Journal of Fiber Science Technology*, Japan, vol. 26, No. 12, 1970, pp. 537-549 along with English summary.
(Continued)

Primary Examiner — Carlos Barcena
(74) Attorney, Agent, or Firm — DLA Piper LLP (US)

(57) ABSTRACT

A polyethylene microporous membrane has a Gurley air permeability of 1 to 1,000 sec/100 mL/25 μm, wherein the total length of waviness widths in the width direction of the polyethylene microporous membrane is not more than one-third of the overall width of the microporous membrane. The polyethylene microporous membrane has excellent planarity without compromising any other important physical property such as permeability.

14 Claims, 4 Drawing Sheets

(51) Int. Cl.
  *B29K 105/00* (2006.01)
  *B29L 7/00* (2006.01)
  *B29L 31/34* (2006.01)
(52) U.S. Cl.
  CPC ............... *C08J 9/28* (2013.01); *C08J 9/365*
    (2013.01); *H01M 2/145* (2013.01); *H01M*
    *2/1653* (2013.01); *B29K 2023/065* (2013.01);
    *B29K 2023/0683* (2013.01); *B29K 2105/0088*
    (2013.01); *B29L 2007/001* (2013.01); *B29L*
    *2031/3468* (2013.01); *C08J 2323/06* (2013.01)
(58) Field of Classification Search
  CPC ...... B29K 2023/065; B29K 2023/0683; B29K
    2105/0088; B29L 2007/001; B29L
    2031/3468; C08J 2323/06; C08J 9/28;
    C08J 9/365
  See application file for complete search history.

(56) References Cited

FOREIGN PATENT DOCUMENTS

| | | |
|---|---|---|
| JP | 2003-103626 | 4/2003 |
| JP | 2003-105122 | 4/2003 |
| JP | 2006-233038 | 9/2006 |
| JP | 2007063547 A * | 3/2007 |
| JP | 2007-273443 | 10/2007 |
| JP | 2010-520095 | 6/2010 |
| JP | 2011-131470 | 7/2011 |
| JP | 2012-11751 | 1/2012 |
| JP | 2012011751 A * | 1/2012 |
| WO | 97/23554 | 7/1997 |
| WO | 2006/106786 | 10/2006 |
| WO | 2007/132942 | 11/2007 |
| WO | 2008/016174 | 2/2008 |

OTHER PUBLICATIONS

K. Matsumoto, et al., "Making Microporous Membrane," *Kyoritsu Shuppan*, 1993, pp. 67 to 86 along with English summary.
S. Okamura, et al., *Kobunshi Kagaku Joron*, (Polymer Chemistry), Second Edition, 1981, partial English translation.
*Kagaku-Dojin Publishing Co., Inc.*, 1981, pp. 90-97, with partial English translation of pp. 92-93.
Sun, T., et al., "Effect of Short Chain Branching on the Coil Dimensions of Polyolefins in Dilute Solution," *Macromolecules*, 2001, vol. 34, pp. 6812-6820.

* cited by examiner

US 9,595,703 B2

POLYETHYLENE MICROPOROUS MEMBRANE AND PROCESS FOR MANUFACTURING SAME

TECHNICAL FIELD

The present invention relates to a polyethylene microporous membrane, particularly, a polyethylene microporous membrane suitable as a battery separator and a process for producing the same.

BACKGROUND ART

A microporous membrane has numerous microscopic pores. These microscopic pores are connected to one another such that the back and front of the microporous membrane are connected to provide permeability. Due to this, the microporous membrane has good permeability, and thus has been used in various applications such as various separators in batteries, electrolytic capacitors, and the like, various separation membranes (filters), absorbent articles represented by diapers and sanitary goods, moisture-permeable waterproof materials for garments and medical use, materials for heat-sensitive receiving papers, and materials for ink receptors. The microporous membrane, particularly, a polyolefin microporous membrane including polyethylene or polypropylene is excellent in permeability and strength, and thus has been used as a battery separator for separating a positive electrode from a negative electrode.

PRIOR ART DOCUMENTS

Patent Documents

To provide a polyolefin microporous membrane excellent in shutdown function and heat resistance for use as a battery separator, applying inorganic filler or the like to a polyolefin microporous membrane to form a coating layer has been studied (e.g., Patent Documents 1 and 2).

In addition, large batteries and capacitors, for example, for automobiles that require a microporous membrane large in both length and width have recently been developed, and needs for large microporous membranes have increased. Accordingly, large microporous membranes that also have good planarity without compromising physical properties such as permeability have been demanded.

Thus, techniques for improving thickness irregularities and planarity have been disclosed (e.g., Patent Documents 3 and 4).
Patent Document 1: JP 2011-131470 A
Patent Document 2: JP 2007-273443 A
Patent Document 3: JP 2012-011751 A
Patent Document 4: JP 2006-233038 A

SUMMARY OF THE INVENTION

Problems to be Solved by the Invention

The polyolefin microporous membranes disclosed in Patent Documents 1 and 2 are disadvantageous in that they may cause waviness during production and after production, which results in poor planarity, and using the polyolefin microporous membrane with poor planarity as a substrate and forming a process layer such as a coating layer thereon leads to occurrence of defects due to processing; for example, a coating agent cannot be applied uniformly, and continuous coating streaks occur on the coating layer.

Also in the polyethylene microporous membranes disclosed in Patent Documents 3 and 4, a technique for reducing waviness to improve planarity is not sufficiently disclosed.

The present invention aims to solve the problems mentioned above, i.e., to provide a polyethylene microporous membrane having excellent planarity without compromising any other important physical property such as permeability.

Means for Solving the Problems

To solve the problems mentioned above, the polyethylene microporous membrane of the present invention has the following constitution:

A polyethylene microporous membrane having a Gurley air permeability of 1 to 1,000 sec/100 mL/25 µm, wherein the total length of waviness widths in the width direction of the polyethylene microporous membrane is not more than one-third of the overall width of the microporous membrane.

The battery of the present invention has the following constitution:

A battery comprising the polyethylene microporous membrane described above or the composite membrane described above as a separator.

The process for producing the polyethylene microporous membrane of the present invention has the following constitution:

A process for producing the polyethylene microporous membrane according to (1) to (4), comprising the steps of (a) preparing a polyethylene solution by heat-dissolving polyethylene or a polyethylene composition in a solvent, (b) extruding the solution of polyethylene or polyethylene composition through a die to form an extrudate, (c) cooling the extrudate to form a gel-like sheet, (d) stretching the gel-like sheet, (e) removing the solvent from the stretched gel-like sheet to obtain a microporous membrane, (f) stretching the microporous membrane from which the solvent has been removed, and (g) following the step (f), heat-relaxing the microporous membrane at least in the longitudinal direction.

In the polyethylene microporous membrane of the present invention, a load necessary to remove slack is preferably 0 to 300 g/mm$^2$.

The polyethylene microporous membrane of the present invention preferably has a porosity of 15 to 85%.

The polyethylene microporous membrane of the present invention is preferably a composite membrane obtained by providing a coating layer on at least one surface of the polyethylene microporous membrane.

In the process for producing the polyethylene microporous membrane of the present invention, the heat-relaxing is preferably performed by utilizing a difference in peripheral speed between rolls.

In the process for producing the polyethylene microporous membrane of the present invention, a relaxation rate in the heat-relaxing is preferably more than 0% but not more than 30% in the longitudinal direction.

Effects of the Invention

The polyethylene microporous membrane of the present invention is excellent in permeability and planarity since it has a Gurley air permeability of 1 to 1,000 sec/100 mL/25 µm, and the total length of waviness widths in the width direction of the polyethylene microporous membrane is not more than one-third of the overall width of the microporous membrane. Such a constitution allows for excellent processability such as uniform formation of a process layer such as a coating layer or a deposited layer, and when the process layer is formed, defects such as a continuous coating streak are unlikely to occur.

Next, the polyethylene microporous membrane of the present invention has a small or no wave since a load necessary to remove slack is 0 to 300 g/mm². Such a constitution facilitates processing such as coating after producing the polyethylene microporous membrane, and uniform coating can be applied to the polyethylene microporous membrane surface, which leads to high productivity.

Further, the polyethylene microporous membrane of the present invention is excellent in absorbency and liquid retention since it has a porosity of 15 to 85%.

Next, the polyethylene microporous membrane of the present invention can be formed into a composite membrane provided with a uniform coating layer with no thickness irregularities by providing a coating layer on at least one surface of the microporous membrane. Such a constitution improves strength, shutdown property, and the like, which leads to high safety.

The battery comprising the polyethylene microporous membrane or the composite membrane of the present invention is excellent in safety and functionality since it comprises the polyethylene microporous membrane excellent in planarity and permeability as a separator.

According to the process for producing the polyethylene microporous membrane of the present invention, the above-mentioned polyethylene microporous membrane excellent in permeability, planarity, and the like can be obtained.

BEST MODE FOR CARRYING OUT THE INVENTION

Figure 1:
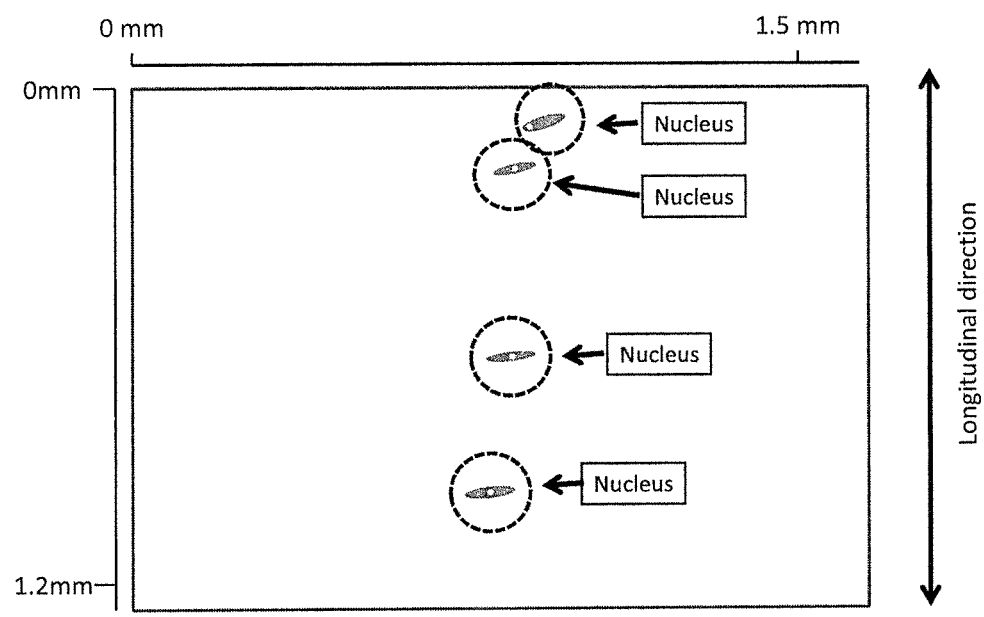
FIG. 1 is a schematic view illustrating an example of the image obtained by noncontact three-dimensional measurement of a microporous membrane surface on which a coating layer is formed. Irregularities on the microporous membrane surface on which a coating layer is formed can be seen in three dimensions. It is illustrated that nuclei are in parts surrounded by circles.

The best mode for carrying out the present invention will now be described in detail. It should be noted, however, that the present invention is not limited to the following embodiments, and various modifications can be made without departing from the spirit of the invention.

First, materials of the polyethylene microporous membrane of the present invention will be described below.

[1] Materials

Polyethylene Resin

The polyethylene microporous membrane of the present invention is composed mainly of a polyethylene resin, and therefore is excellent in heat resistance, moldability, reduction in production cost, chemical resistance, resistance to oxidation/reduction, and the like. The polyethylene resin may be made of polyethylene alone, and is preferably made of a polyethylene composition composed mainly of polyethylene.

To improve porosity, permeability, and mechanical strength, the amount of the polyethylene or polyethylene composition is preferably 70% by weight or more based on the total weight of all polymers constituting the microporous membrane, more preferably 80% by weight or more, and still more preferably 85% by weight or more.

The polyethylene or polyethylene composition preferably has a weight average molecular weight (Mw) of $5\times10^5$ or more, more preferably $5\times10^5$ to $5\times10^6$. When the weight average molecular weight is in this preferred range, not only rupture of the microporous membrane is unlikely to occur during the stretching step in the production of the microporous membrane, but also it is easy to perform melt extrusion.

Next, the molecular weight distribution (weight average molecular weight (Mw)/number average molecular weight (Mn)) of the polyethylene or polyethylene composition for use in the present invention is preferably 4 to 300, more preferably 10 to 100. With Mw/Mn in this range, the microporous membrane can be provided with high strength while maintaining the processability in melt extrusion.

Polyethylene Composition

It is preferable to use a polyethylene composition for the polyethylene microporous membrane of the present invention. In particular, a composition of a first polyethylene having a weight average molecular weight (Mw) of $5\times10^5$ to $9\times10^5$ and a second polyethylene having a Mw of $1\times10^6$ to $5\times10^6$ is most preferred. By using the polyethylene composition of the first polyethylene and the second polyethylene, the production using melt extrusion becomes easy, and at the same time, the microporous membrane can be provided with high strength, in particular, high pin puncture strength and high mechanical strength.

First Polyethylene

Examples of the first polyethylene include high-density polyethylene, medium-density polyethylene, branched low-density polyethylene, and linear low-density polyethylene. Preferred is high-density polyethylene.

The first polyethylene may be not only an ethylene homopolymer but also an ethylene.α-olefin copolymer containing a small amount of α-olefin other than ethylene. Preferred α-olefins other than ethylene are propylene, butene-1, pentene-1, hexene-1,4-methylpentene-1, and octene-1. In addition, vinyl acetate, methyl methacrylate, and styrene may be contained. Through the copolymerization of ethylene and α-olefin other than ethylene, the first polyethylene can have a melting point of 132° C. or higher. The melting point is determined by differential scanning calorimetry (DSC) according to JIS K7121 (1987). The amount of α-olefin other than ethylene is preferably 0 to 5 mol % in order to retain the mechanical strength of the microporous membrane. Further, the first polyethylene may be used alone or in combination of two or more.

The Mw of the first polyethylene is preferably $5\times10^5$ to $9\times10^5$, more preferably $5\times10^5$ to $8\times10^5$, and still more preferably $5.5\times10^5$ to $7\times10^5$. The molecular weight distribution of the first polyethylene is preferably more than 0 but not more than 50, more preferably 2 to 50, still more preferably 3 to 15, and most preferably 4 to 10.

To produce a microporous membrane having high permeability and high mechanical strength, the number of terminal vinyl groups of the first polyethylene is preferably less than 0.2 per 10,000 carbon atoms. Such a polyethylene can be produced using, for example, a Ziegler-Natta catalyst or single-site polymerization catalyst. The number of terminal vinyl groups can be determined by the method described in WO1997/23554.

Second Polyethylene

The second polyethylene is preferably ultra-high molecular weight polyethylene. The ultra-high molecular weight polyethylene may be not only an ethylene homopolymer, and examples of α-olefins other than ethylene include propylene, butene-1, pentene-1, hexene-1,4-methylpentene-1, and octene-1. In addition, vinyl acetate, methyl methacrylate, and styrene can also be used. The amount of α-olefin other than ethylene is preferably 0 to 5 mol %.

The Mw of the second polyethylene is preferably $1 \times 10^6$ to $5 \times 10^6$, more preferably $1 \times 10^6$ to $3 \times 10^6$. The molecular weight distribution of the second polyethylene is preferably 1.2 to 50, more preferably 3 to 20, still more preferably 4 to 15, and most preferably 4 to 10.

The second polyethylene can be produced using, for example, a Ziegler-Natta catalyst or single-site polymerization catalyst. The melting point of the second polyethylene is preferably 134° C. or higher but lower than 220° C. in order to provide good processability in melt extrusion.

The amount of the second polyethylene is preferably 1 to 50% by weight based on 100% by weight of the total polyethylene composition, more preferably 2 to 45% by weight, and most preferably 5 to 40% by weight. With the amount of the second polyethylene in such a range, the polyethylene microporous membrane of the present invention can be provided with high mechanical strength and excellent porosity.

Other Additives

The polyethylene or polyethylene composition mentioned above may contain other components such as inorganic fillers and heat-resistant polymers. Examples of inorganic fillers include fillers containing silicon and/or aluminum atoms. The heat-resistant polymer is a thermoplastic resin having a melting point higher than those of the first and the second polyethylene mentioned above. Examples thereof include polyolefins such as polypropylene. Since the microporous membrane is produced using melt extrusion, the melting point of the heat-resistant polymer, from the standpoint of processability, is preferably (melting point of first polyethylene) to (melting point of first polyethylene+ 50° C.). Preferred inorganic fillers and heat-resistant polymers include those which are described in WO2007/132942 and WO2008/016174. The amount of each of the inorganic filler and the heat-resistant polymer is preferably 10% by weight or less based on 100% by weight of the weight of the microporous membrane.

Further, to the polyethylene or polyethylene composition for use in the present invention, linear low-density polyethylene (LLDPE) produced by a low-pressure process, low-density polyethylene (LDPE) produced by a medium-pressure process, ethylene α-olefin copolymer produced using a single-site catalyst, or low-molecular-weight polyethylene having a weight average molecular weight of 1,000 to 4,000 can be added to provide a shutdown function at low temperatures, thereby improving properties of a battery separator. However, to effectively prevent rupture of the microporous membrane during the stretching step in the production, the amount of low-density polyethylene is preferably 0 to 20% by weight of the polyethylene composition.

Further, to the polyethylene or polyethylene composition for use in the present invention, polypropylene can be added to improve the meltdown temperature of the polyethylene microporous membrane of the present invention used as a battery separator. The type of polypropylene may be block copolymer and random copolymer as well as homopolymer. The block copolymer and random copolymer can contain a copolymer component such as other α-ethylenes other than propylene, and preferred such other α-ethylene is ethylene.

In addition, to the polyethylene microporous membrane of the present invention, various additives such as antioxidants, heat stabilizers, antistatic agents, UV absorbers, antiblocking agents, and filling materials may be added as long as the effects of the present invention are not impaired. In particular, it is preferable to add an antioxidant for the purpose of preventing oxidation degradation due to thermal histories of polyethylene resin. Appropriate selection of the type and amount of antioxidant and heat stabilizer is important for adjusting or enhancing the properties of the microporous membrane.

[2] Process for Producing Polyethylene Microporous Membrane

Next, the process for producing the polyethylene microporous membrane of the present invention will be described in detail. However, the process for producing the polyethylene microporous membrane of the present invention is not limited thereto.

(a) Preparation of Polyethylene Solution

Polyethylene or a polyethylene composition is heat-dissolved in a solvent to prepare a polyethylene solution. The polyethylene composition, as mentioned above, is preferably prepared from a first polyethylene and a second polyethylene, and a composition of a first polyethylene having a weight average molecular weight (Mw) of $5 \times 10^5$ to $9 \times 10^5$ and a second polyethylene having a Mw of $1 \times 10^6$ to $5 \times 10^6$ is most preferred.

Here, the solvent may be any solvent that can dissolve polyethylene sufficiently. To enable stretching at a relatively high magnification, the solvent is preferably liquid at room temperature. Examples of liquid solvents include aliphatic, alicyclic, and aromatic hydrocarbons such as nonane, decane, decalin, p-xylene, undecane, dodecane, and liquid paraffin; mineral oil distillates having boiling points comparable to those of the above hydrocarbons; and phthalates liquid at room temperature, such as dibutyl phthalate and dioctyl phthalate. To produce a gel-like sheet with a stable liquid solvent content, it is preferable to use a nonvolatile liquid solvent such as liquid paraffin. A solvent that are miscible with polyethylene in a melt-blended state but solid at room temperature may be added to the liquid solvent. Examples of such solid solvents include stearyl alcohol, ceryl alcohol, and paraffin wax.

The viscosity of the liquid solvent is preferably 20 to 200 cSt at 40° C. When the viscosity at 40° C. is not less than 20 cSt, a sheet formed by extrusion of the polyethylene solution through a die is unlikely to be ununiform. When it is not more than 200 cSt, the liquid solvent can be easily removed.

(b) Formation of Extrudate

Homogeneous melt blending of the polyethylene solution, if it is desired to prepare a polyethylene solution at high concentration, is preferably but not exclusively performed in a twin-screw extruder. Various additives such as antioxidants may be optionally added as long as the effects of the present invention are not impaired. In particular, it is preferable to add an antioxidant to prevent oxidation of polyethylene.

In the extruder, the polyethylene solution is homogeneously mixed at a temperature at which the polyethylene or polyethylene composition completely melts. The melt blending temperature varies depending on the polyethylene or polyethylene composition used, and it is preferably (melting point of polyethylene or polyethylene composition+10° C.) to (melting point of polyethylene or polyethylene composition+120° C.). It is more preferably (melting point of polyethylene or polyethylene composition+20° C.) to (melting point of polyethylene or polyethylene composition+100° C.). Here, "melting point" refers to a value determined by DSC according to JIS K7121 (1987), and so on. For example, the melt blending temperature in the case of polyethylene is preferably in the range of 140 to 250° C., more preferably 160 to 230° C., and most preferably 170 to 200° C. Specifically, since the polyethylene composition has a melting point of about 130 to 140° C., the melt blending temperature is preferably 140 to 250° C., most preferably 180 to 230° C.

The melt blending temperature in the case where the polyethylene solution includes polypropylene is preferably 190 to 270° C., particularly preferably 190 to 250° C. When polypropylene is included, particularly from the standpoint of improving blending and dispersibility/distributivity of resin, a polypropylene solution is supplied to the polyethylene or polyethylene composition in a melt-blended state at some midpoint of the extruder.

To prevent resin degradation, the melt blending temperature is preferably lower. When the melt blending temperature is in this preferred range, no unmelt occurs in the extrudate extruded through a die, and membrane rupture or the like does not occur in a subsequent stretching step; in addition, polyethylene pyrolysis is unlikely to occur, and the resulting microporous membrane is provided with excellent physical properties, for example, pin puncture strength, tensile strength, and the like.

For the blending ratios of the polyethylene or polyethylene composition and the solvent, the amount of the polyethylene or polyethylene composition is 10 to 50% by weight, preferably 10 to 30% by weight, based on 100% by weight of the total of the polyethylene or polyethylene composition and the solvent in order to improve the moldability of the extrudate. It is more preferably 20 to 30% by weight. The preferred amount of the solvent is 90 to 50% by weight, more preferably 90 to 70% by weight, and still more preferably 80 to 70% by weight. When the blending ratios of the polyethylene or polyethylene composition and the solvent are in these preferred ranges, excellent membrane-forming properties are provided, i.e., in molding into a sheet, swelling and neck-in at a die exit are reduced (good moldability into a sheet), and in addition, excellent moldability is provided, i.e., shrinkage in the thickness direction is small.

The ratio of the length (L) to the diameter (D) (L/D) of a screw of the twin-screw extruder is preferably 20 to 100, more preferably 35 to 70 in order to provide good blendability and dispersibility/distributivity of resin. L/D of 20 or more provides sufficient melt blending. L/D of 100 or less will not lead to excessively prolonged residence time of the polyethylene solution. To provide good dispersibility/distributivity while preventing degradation of blending resin, the cylinder bore of the twin-screw extruder is preferably 40 to 100 mm.

To provide excellent thickness uniformity of the microporous membrane by satisfactorily dispersing polyethylene in the extrudate, the screw speed (Ns) of the twin-screw extruder is preferably 300 to 600 rpm or more. Further, the ratio of the extrusion rate Q (kg/h) of the polyethylene solution to the Ns (rpm), Q/Ns, is preferably more than 0 kg/h/rpm but not more than 0.4 kg/h/rpm, more preferably more than 0 kg/h/rpm but not more than 0.35 kg/h/rpm.

The heated solution of the melt-blended polyethylene or polyethylene composition is extruded, directly or via another extruder, through a die, and molded such that a final product microporous membrane will have a thickness of 5 to 100 to obtain an extrudate. The die may be a rectangular T-die. When a T-die is used, from the standpoint of ease of control of the thickness of a final product microporous membrane, the die preferably has a slit opening of 0.1 to 5 mm, and it is preferable to heat from 140 to 250° C. at extrusion.

(c) Formation of Gel-Like Sheet

The extrudate obtained is then cooled to form a gel-like sheet. Cooling allows the polyethylene microphase separated by the solvent to be fixed. It is preferable cool to 10 to 45° C. The cooling is preferably performed at least to a gelation temperature or below at a rate of 30° C./min or higher, more preferably a rate of 50° C./min or higher. A cooling rate in this preferred range does not increase the crystallinity, and a gel-like sheet suitable for stretching tends to be formed. In general, when the cooling rate is slow, relatively large polyethylene crystals are formed, thus resulting in a gel-like sheet with a coarse high-order structure, and also pseudo-cell units forming the structure is large; when the cooling rate is fast, relatively small polyethylene crystals are formed, thus resulting in a gel-like sheet with a dense high-order structure, and dense cell units.

Examples of the cooling method include directly contacting with cold air, cooling water, or any other cooling medium, contacting with a roll cooled with a cooling medium, and using a casting drum or the like. The solution extruded through a die may be taken up before cooling or during cooling at a take-up ratio of preferably 1 to 10, more preferably 1 to 5. When the take-up ratio is in this preferred range, neck-in is reduced, and rupture is less likely to occur during stretching. The thickness of the gel-like sheet is preferably 0.5 to 5 mm, more preferably 0.7 to 3 mm.

Although the description has been made in terms of monolayer microporous membranes, the polyethylene microporous membrane of the present invention is not limited to a monolayer and may be a laminate. Laminated parts may each contain a desired resin, in addition to polyethylene as mentioned above, to the extent that the effects of the present invention are not impaired. The polyethylene microporous membrane can be laminated by any conventional method. For example, desired resins are prepared as required; these resins are separately fed to extruders, melted at a desired temperature, and joined in a polymer tube or a die; and the resins are extruded through a slit die at each desired lamination thickness to form a laminate.

(d) Stretching

The gel-like (unstretched and laminated) sheet obtained is stretched. The stretching is carried out at a predetermined magnification by heating the gel-like sheet using a conventional tenter method, roll method, inflation method, rolling method, or a combination of these methods. The stretching may be monoaxial stretching or biaxial stretching, but biaxial stretching is preferred in order to provide a microporous membrane with high strength. Here, the production direction of the gel-like sheet is defined as a longitudinal direction, and the direction of the gel-like sheet perpendicular to the longitudinal direction as a width direction. The biaxial stretching may be carried out by a stepwise biaxial stretching method in which, for example, stretching is carried out in the width direction after stretching in the longitudinal direction, a simultaneous biaxial stretching method in which stretching is carried out simultaneously in the longitudinal direction and the width direction using a simultaneous biaxial tenter or the like, and further a combination of the stepwise biaxial stretching method and the simultaneous biaxial stretching method. In particular, the simultaneous biaxial stretching method is preferably used. In the simultaneous biaxial stretching method, as compared to the stepwise biaxial stretching method, crystals grow uniformly in the longitudinal direction and the width direction during the stretching step, and thus it is easy to stretch the gel-like sheet stably to a high magnification. In addition, it is easy to control the physical property balance of the microporous membrane in the longitudinal direction and the width direction.

The stretching temperature is preferably set at the melting point of the polyethylene or polyethylene composition+10° C. or lower, more preferably in the range from (crystal dispersion temperature (Tcd) of polyethylene or polyethylene composition) to (melting point of polyethylene or polyethylene composition). When the stretching temperature is in this preferred range, the polyethylene or polyethylene composition does not melt, and molecular chains can be oriented by stretching; at the same time, the polyethylene or polyethylene composition softens sufficiently, and membrane rupture is less likely to occur during stretching, leading to a high-magnification stretching. Specifically, since the polyethylene or polyethylene composition has a crystal dispersion temperature of about 90 to 100° C., the stretching temperature is set at 90 to 130° C., preferably 100 to 120° C., more preferably 110 to 120° C., and most preferably 115 to 120° C. The crystal dispersion temperature (Tcd) is determined from temperature characteristics of dynamic viscoelasticity measured according to ASTM D4065. Alternatively, it may be determined from NMR.

The stretching magnification varies depending on the thickness of the gel-like sheet, but in the case of monoaxial stretching, it is preferably 2 or more, more preferably 3 to 30. In the case of biaxial stretching, stretching is preferably performed at a magnification of 3 or more in both directions. In area magnification, the stretching magnification is preferably 9 or more, more preferably 16 or more, and most preferably 20 or more. An area magnification of less than 9 results in insufficient stretching, and a high-strength microporous membrane cannot be obtained. The area magnification is preferably not more than 400. When the stretching magnification is in this preferred range, rupture is less likely to occur during the production of a microporous membrane, leading to high productivity. In biaxial stretching, the stretching magnifications in the longitudinal direction and the width direction need not be the same.

The stretching as described above causes cleavage between polyethylene lamellae, makes the polyethylene phase finer, and forms large number of fibrils. The fibrils form a network structure in which they are connected three-dimensionally and irregularly. The stretching improves mechanical strength and expands pores, making the gel-like sheet suitable for a battery separator.

(e) Washing

Next, the solvent remaining in the gel-like sheet is removed using a washing solvent. Since the polyethylene phase and the solvent phase are separated, removing the solvent provides a microporous membrane. Examples of washing solvents include volatile solvents, for example, saturated hydrocarbons such as pentane, hexane, and heptane; chlorinated hydrocarbons such as methylene chloride and carbon tetrachloride; ethers such as diethyl ether and dioxane; ketones such as methyl ethyl ketone; linear fluorocarbons such as trifluoroethane, $C_6F_{14}$, and $C_7F_{16}$; cyclic hydrofluorocarbons such as $C_5H_3F_7$; hydrofluoroethers such as $C_4F_9OCH_3$ and $C_4F_9OC_2H_5$; and perfluoroethers such as $C_4F_9OCF_3$ and $C_4F_9OC_2F_5$. These washing solvents have a low surface tension (e.g., 24 mN/m or less at 25° C.). Using a washing solvent having a low surface tension prevents the network structure forming micropores from shrinking due to a surface tension at gas-liquid interfaces during drying after washing, thereby providing a microporous membrane having high porosity and permeability. These washing solvents are appropriately selected according to the solvent used to dissolve the polyethylene or polyethylene composition and used alone or in combination.

Washing may be carried out, for example, by immersing a gel-like sheet in a washing solvent for extraction, showering a washing solvent on a gel-like sheet, or a combination thereof. The amount of washing solvent used varies depending on the washing method, and, generally, it is preferably 300 parts by weight or more based on 100 parts by weight of the gel-like sheet. The washing temperature may be 15 to 30° C. and raised to 80° C. or lower as required. In the washing, the longer the time period during which the gel-like sheet is immersed in a washing solvent is, the better it is for improving the washing effect of the solvent, avoiding unbalanced physical properties of the resulting microporous membrane in the width direction and/or the longitudinal direction, and improving the mechanical physical properties and electrical physical properties of the microporous membrane.

The washing as mentioned above is preferably performed until the amount of the residual solvent in the gel-like sheet after washing, i.e., the microporous membrane, is reduced to less than 1% by weight.

The washing solvent is then removed by drying. The drying may be carried out by any method such as heat-drying and air-drying. The drying temperature is preferably not higher than the crystal dispersion temperature (Tcd) of the polyethylene composition, particularly preferably (Tcd−5° C.) or lower. The drying is preferably performed until the amount of the residual washing solvent is reduced to 5% by weight or less, more preferably 3% by weight or less, based on 100% by weight of the dry weight of the microporous membrane. If the drying is performed sufficiently, the porosity of the microporous membrane is not reduced by subsequent heat treatment, leading to high permeability.

(f) Re-Stretching

The dried microporous membrane is stretched (re-stretched) in at least one direction. Prior to re-stretching, a desired resin layer may optionally be provided on the microporous membrane by extrusion lamination, coating, or the like.

The re-stretching can be carried out similarly to the stretching mentioned above using a tenter method or the like while heating the microporous membrane. The re-stretching may be monoaxial stretching or biaxial stretching. In the case of biaxial stretching, either simultaneous biaxial stretching or stepwise stretching may be used, but simultaneous biaxial stretching is preferred. In the case of multistep stretching, simultaneous biaxial stretching or/and stepwise stretching are combined.

The temperature of the re-stretching is preferably not higher than the melting point of the polyethylene composition, more preferably in the range from (Tcd−20° C.) to the melting point. Specifically, it is preferably 70 to 135° C., more preferably 110 to 132° C., and most preferably 120 to 130° C.

The magnification of the re-stretching, in the case of monoaxial stretching, is preferably 1.01 to 1.6, preferably 1.1 to 1.6 particularly in the width direction, and more preferably 1.2 to 1.5. In the case of biaxial stretching, it is preferably 1.01 to 1.6 in each of the longitudinal direction and the width direction. The magnifications of the re-stretching in the longitudinal direction and the width direction may be different.

The rate of the re-stretching is preferably 3%/sec or higher, more preferably 5%/sec or higher, in both the longitudinal and the width direction. The upper limit is preferably 50%/sec or lower, preferably 25%/sec or lower. The re-stretching rates may be set independently in the longitudinal direction and the width direction.

The microporous membrane is preferably oriented in one direction by stretching in at least one direction. The orientation in at least one direction enhances the strength of the microporous membrane. Also, stretching/orienting the microporous membrane in at least one direction promotes pore formation, which significantly improves permeability. Further, by stretching/orienting the microporous membrane in the longitudinal direction, the membrane-forming speed (=line speed) can be increased in the production process even if the cast speed is the same, which increases the area of microporous membranes produced per unit time. In other words, the cost per unit area can be reduced.

Further, the microporous membrane is more preferably biaxially-oriented by stretching in at least two directions. The biaxial orientation of the microporous membrane provides the microporous membrane with excellent balance of strengths in two directions. The biaxial orientation of the microporous membrane provides the microporous membrane with toughness, and as a result, the microporous membrane does not readily tear in any direction. This prevents the microporous membrane from shrinking excessively in the transverse direction and breaking during secondary processing.

For producing a biaxially-oriented microporous membrane, for example, various membrane-forming methods represented by various biaxial stretching methods such as simultaneous biaxial stretching, stepwise biaxial stretching, and subsequent re-stretching are used, and to maintain good balance between pore size and elasticity in the longitudinal direction and produce a microporous membrane with high permeability and high strength with high productivity, it is important to use a longitudinal-transverse simultaneous biaxial stretching method or longitudinal-transverse stepwise biaxial stretching method. The longitudinal-transverse simultaneous biaxial stretching method and stepwise biaxial stretching method are advantageous stretching methods because it is easy to control the physical property balance of the microporous membrane in the longitudinal direction and the width direction, and thus when a battery or the like is produced using the microporous membrane as a separator, preferred battery properties can be provided.

For the microporous membrane, one of the steps of (d) stretching and (f) re-stretching may be performed, but it is preferable to perform both of the steps.

(g) Heat-Relaxing

The stretched microporous membrane is heat-relaxed. The heat-relaxing stabilizes crystals and makes lamellae uniform. The heat-relaxing refers to a heat treatment for thermally shrinking the microporous membrane in the longitudinal direction and the width direction during heating.

The heat-relaxing is preferably carried out after the last stretching of the microporous membrane, preferably at the end of the process for producing the microporous membrane, for example, immediately before finishing the microporous membrane as a final product or immediately before taking up the microporous membrane on a roll. Heating in the heat-relaxing may be carried out, for example, by heating the microporous membrane after re-stretching in the same heating furnace as used for the re-stretching, or by a method in which after the microporous membrane has left the heating furnace as used for re-stretching, heating is carried out in another heating furnace.

Here, the heat-relaxing temperature is most preferably around the Tcd of the resin that is a principal component of the microporous membrane. Specifically, the heat treatment temperature is preferably in the range of Tcd to Tm, and (Tcd−30° C.) to (Tcd+20° C.). It is more preferably (Tcd−20° C.) to (Tcd+15° C.), and most preferably (Tcd−10° C.) to (Tcd+10° C.). In particular, the relaxing temperature of the polyethylene microporous membrane of the present invention is preferably 50 to 115° C., more preferably 60 to 110° C.

The time for the heat-relaxing is preferably 1,000 seconds or less, more preferably 800 seconds or less, still more preferably 50 seconds or less, and most preferably 20 seconds or less.

The heat-relaxing may be performed in a single step or multiple steps in the longitudinal direction, or it may be performed simultaneously or sequentially in the longitudinal direction and the width direction.

Heat-Relaxing in Longitudinal Direction

In the process for producing the polyethylene microporous membrane of the present invention, it is important to heat-relax the polyethylene microporous membrane at least in the longitudinal direction. Heat-relaxing the polyethylene microporous membrane of the present invention at least in the longitudinal direction can reduce the residual stress in the longitudinal direction that remains in the microporous membrane after stretching, reduce the waviness width, and provide good planarity.

When the relaxation rate in the longitudinal direction is low, the heat shrinkage rate of the resulting microporous membrane in the longitudinal direction and the width direction after 8 hours at 105° C. remains high, but the waviness width of the microporous membrane and the load necessary to remove slack are reduced in some cases. On the other hand, when the relaxation rate in the longitudinal direction is high, the heat shrinkage rate of the resulting microporous membrane in the longitudinal direction after 8 hours at 105° C. is reduced, but the waviness width of the microporous membrane and the load necessary to remove slack are not reduced in some cases. The present inventors found that the heat shrinkage rate does not correlate with the waviness width or with the load necessary to remove slack.

Thus, the relaxation rate in the longitudinal direction is preferably more than 0% but not more than 30%, more preferably more than 0% but not more than 10%, still more preferably not more than 5%, and most preferably 1% to 3%. The relaxation rate was calculated by the following equation.

Relaxation rate (%)=100×(length before relaxing−length after relaxing)/length before relaxing The microporous membrane can be heat-relaxed in the longitudinal direction by a conventional method. For example, a tenter method in which a microporous membrane is held by clips such as linear motor clips in a tenter, and while being heated, the clip-to-clip distance is reduced in the longitudinal direction, and a method in which the tension in the longitudinal direction is reduced by making an incision with a cutter at edges or the central part of a microporous membrane held by clips in a tenter can be used. In particular, in the process for producing the polyethylene microporous membrane of the present invention, it is preferable to relax the microporous membrane in the longitudinal direction by conveying the microporous membrane on heated rolls having a difference in peripheral speed between the rolls such that the peripheral speed of a roll in the rear (near a winder) is slower than the peripheral speed of a roll in the front (near an extruder). By relaxing the microporous membrane in the longitudinal direction using rolls, as compared to the tenter clip system, not only the microporous membrane can be uniformly heated at a desired temperature, but also the relaxation rate and the relaxation speed are easily controlled. Thus, the most preferred relaxing system is a heated roll system.

In the heat-relaxing using heating rolls, the number of rolls is not restricted, but at least two rolls are required because it is necessary to utilize the difference in peripheral speed between rolls to shrink and relax the microporous membrane in the longitudinal direction. The contact time with the heating rolls (heating time) is preferably at least 1 second. The contact time between the microporous membrane and the heating rolls can be controlled by the film production speed of the microporous membrane, the diameter of the heating rolls, and the entry angle of the microporous membrane into the rolls. To increase the relaxation rate, three or more heating rolls may be used.

The diameter of the rolls for use in the process for producing the polyethylene microporous membrane of the present invention is 150 to 450 mm, preferably 250 to 350 mm.

For the material of the rolls for use in the process for producing the polyethylene microporous membrane of the present invention, metal rolls such as stainless rolls, iron rolls, and plated rolls thereof; hard chrome rolls; rubber rolls made by covering a metal core with rubber; ceramic rolls made by covering a metal core with ceramic; and the like are suitably used. Examples of the method of heating the rolls include heating by passing heated steam, hot water, or a heating medium through the inner hollow core, heating by providing a heating wire inside, and heating by induction heating using electromagnetic waves.

Heat-Relaxing in Width Direction

In the process for producing the polyethylene microporous membrane of the present invention, when the polyethylene microporous membrane is heat-relaxed in the longitudinal direction, it may be heat-relaxed in the width direction simultaneously or sequentially. Heat-relaxing in the longitudinal direction and the width direction can reduce the change in thickness in the longitudinal direction and the width direction with the passage of time and the change in length in the longitudinal direction and the width direction with the passage of time, leading to reduction in waviness formation.

The microporous membrane can be heat-relaxed in the width direction by a conventional method, and examples thereof include a method in which a microporous membrane is held by clips in a tenter, and while being heated, the clip-to-clip distance is reduced in the width direction, and a method in which the tension in the width direction is reduced by making an incision with a cutter at edges or the central part of a microporous membrane held by clips in a tenter.

When the length of the microporous membrane in the width direction before heat-relaxing is taken as 1, the length in the width direction after relaxing is preferably less than 1 but not less than 0.7. When the length in the width direction after heat-relaxing is in this preferred range, the microporous membrane is provided with high strength and not too high an air permeability, which is advantageous when it is used as a battery separator.

As described above, by heat-relaxing the microporous membrane at least in the longitudinal direction, the polyethylene microporous membrane of the present invention having good permeability and good planarity can be obtained.

Further, the polyethylene microporous membrane of the present invention produced through the above steps may be wound up to form a roll-shaped winding.

(h) Other Treatments

In addition to the above steps, the stretched gel-like sheet and/or the microporous membrane after re-stretching may be heat set. Heat setting is a heat treatment in which the microporous membrane is heated while maintaining its size constant. The heat setting can be performed by a conventional method, for example, heating the microporous membrane while being fixed with a tenter. The heat setting stabilizes crystallization of the gel-like sheet and makes lamellae uniform. As a result, the network structure made of fibrils formed by stretching is stabilized, and through the subsequent solvent removal, a microporous membrane having high mechanical strength and a low heat shrinkage rate can be produced. The heat setting temperature is preferably in a temperature range from (Tcd−20° C.) to melting point (Tm).

The heat setting is performed after each of the steps of (d) stretching and (g) re-stretching to thereby reduce shrinkage of the microporous membrane. When the heat setting is performed, the heat-relaxing is preferably performed after the heat setting.

Further, the microporous membrane may be subjected to hydrophilization according to the intended use. The hydrophilization can be performed by monomer grafting, surfactant treatment, corona discharging, or the like. The monomer grafting is preferably carried out after crosslinking.

In the case of surfactant treatment, any of nonionic surfactants, cationic surfactants, anionic surfactants, and zwitterionic surfactants can be used, but nonionic surfactants are preferred. The microporous membrane is immersed in a solution obtained by dissolving a surfactant in water or lower alcohol such as methanol, ethanol, or isopropyl alcohol; alternatively, the solution is applied to the microporous membrane by a doctor blade method.

If necessary, at least one surface of the microporous membrane is subjected to corona discharge treatment in air, nitrogen, or a mixed atmosphere of carbon dioxide and nitrogen.

Next, a method of producing a composite membrane by coating the polyethylene microporous membrane of the present invention will be described.

[3] Method of Producing Composite Membrane

The polyethylene microporous membrane of the present invention is preferably provided with a coating layer on at least one surface to form a composite membrane. The coating layer, similarly to the polyethylene microporous membrane mentioned above, has numerous micropores inside and a structure in which these micropores are connected, and is permeable to gas or liquid from one surface to the other surface. The coating layer can be formed by a conventional method, and it may comprise an organic high molecular compound and may comprise an inorganic filler. Examples of organic high molecular compounds include one or two or more selected from the group consisting of aromatic polyamide, polyimide, polyethersulfone, polysulfone, polyether ketone, and polyetherimide. In particular, from the standpoint of heat resistance, a coating layer having heat resistance such as polyvinylidene fluoride or ceramic coating is formed on at least one surface of the polyethylene microporous membrane of the present invention to provide a composite membrane, whereby when the polyethylene microporous membrane of the present invention is used as a separator in a lithium ion secondary battery, the battery can be provided with excellent safety.

Since the polyethylene microporous membrane of the present invention has excellent planarity, when a coating layer is formed, coating defects of the coating layer, such as thickness irregularities, coating irregularities, and coating streaks, are unlikely to occur, which can contribute to improvement of the productivity in coating processing.

Further, by coating the polyethylene microporous membrane of the present invention, the occurrence of continuous coating streak defects can be reduced. Here, "continuous coating streak defect" means a coating streak formed of a series of nuclei as shown in FIG. 1, and is often in the form where a resin component spreads around one nucleus like the foot of a mountain. The continuous coating streak defect is very low in height and thin, and therefore is detected under the specific conditions mentioned below by combining two methods, detection using a three-band fluorescent lamp in a darkroom and detection using bromine light.

The continuous coating streak defect as defined herein includes those in which the nucleus is divided into a plurality of small parts. The continuous coating streak defect defined by the present invention differs in size, shape, and formation mechanism from large coating streak defects which can be detected with relative ease using only bromine light and are formed in such a manner that particle aggregates existing in a coating solution are densely gathered on a microporous membrane and scattered in streaks.

[4] Physical Properties of Polyethylene Microporous Membrane

Next, physical properties of the polyethylene microporous membrane of the present invention will be described.

(a) Gurley Air Permeability

The polyethylene microporous membrane of the present invention has a Gurley air permeability of 1 to 1,000 sec/100 mL/25 μm. Gurley air permeability is an indicator of permeability measured according to JIS P 8117 (1998), which is a time to pass 100 mL of air through a microporous membrane with an area of 642 mm². A smaller Gurley air permeability value indicates a higher permeability of the microporous membrane to gas, liquid, and the like, and it can be considered that if the microporous membrane has a smaller Gurley air permeability while having substantially the same pore size and porosity, more through-holes are formed in the microporous membrane.

When the Gurley air permeability is less than 1 sec/100 mL/25 μm, the microporous membrane has a reduced strength, and when used as a separator, pinholes readily occur, which can cause a short circuit, and when wound for storage in a battery, it is highly likely to rupture. A Gurley air permeability of more than 1,000 sec/100 mL/25 μm leads to poor ion conductivity. To achieve both strength and high ion conductivity of a separator, the Gurley air permeability is more preferably 1 to 1,000 sec/100 mL/25 μm, particularly preferably 50 to 600 sec/100 mL/25 μm, and most preferably 70 to 500 sec/100 mL/25 μm.

The method of controlling the Gurley air permeability within such a preferred range is not critical, and it can be easily achieved, for example, by adjusting the ratio of the first polyethylene to the second polyethylene mentioned above or the ratio of the polyethylene and/or polyethylene composition to a plasticizer. Alternatively, by lowering the resin concentration in solvent at the time of production, through-holes can be increased to achieve a smaller Gurley air permeability. Further, the Gurley air permeability can be controlled within a preferred range by employing the stretching conditions mentioned below.

(b) Waviness Width in Width Direction

In the polyethylene microporous membrane of the present invention, the total length of waviness widths in the width direction of the polyethylene microporous membrane is not more than one-third of the overall width of the microporous membrane. Herein, the production direction of a microporous membrane is defined as a longitudinal direction, and the direction flush with and perpendicular to the longitudinal direction of the microporous membrane as a width direction. Herein, waviness refers to a state where when a microporous membrane is placed on a flat surface, there is a part rising up above the surface, and waviness width is a length of the part rising up. Thus, the waviness width cannot be less than 0. In cases where the total length of waviness widths in the width direction of the polyethylene microporous membrane is more than one-third of the overall width of the microporous membrane, due to an increased irregular region, when the microporous membrane is wound and stored in a battery as a separator, the battery has a decreased function and low safety. Further, when a process layer such as a coating layer is formed on at least one surface of the microporous membrane, the coating layer has an ununiform thickness and irregularities, leading to decrease, for example, in mechanical strength.

From the standpoint of improving the processability such as thickness uniformity in forming a process layer on the surface of the polyethylene microporous membrane of the present invention, and from the standpoint of yield of battery production, the total length of waviness widths in the width direction of the polyethylene microporous membrane needs to be not more than one-third of the overall width of the microporous membrane, and is preferably not more than one-fourth, more preferably not more than one-fifth, and still more preferably not more than one-sixth.

The waviness width can be effectively controlled within such a preferred range by relaxing the microporous membrane at least in the longitudinal direction after the last stretching of the microporous membrane, preferably at the end of the process for producing the microporous membrane, for example, immediately before finishing the microporous membrane as a final product or immediately before taking up the microporous membrane on a roll, as described above.

(c) Load Necessary to Remove Slack

In the polyethylene microporous membrane of the present invention, the load necessary to remove slack is preferably 0 to 300 g/mm², more preferably 0 to 200 g/mm², and still more preferably 0 to 150 g/mm². When the load necessary to remove slack is in this preferred range, slack, and in turn, waviness can be easily reduced or removed with a small load. Conventionally, in forming a process layer such as a coating layer on the surface layer of a microporous membrane, it has been necessary, for example, to apply a high tension to remove slack when the microporous membrane is held using a winder or a coater. Thus, in some cases, the microporous membrane extended, or the production yield decreased due to the narrow effective range of production conditions. However in the polyethylene microporous membrane of the present invention, since the load necessary to remove slack is small, the microporous membrane can be prevented from extending, and further, the production yield in processing can be improved.

(d) Porosity

The porosity of the polyethylene microporous membrane of the present invention is preferably 15% to 85%. If the polyethylene microporous membrane of the present invention has a high porosity, when it is used as a battery separator, electrical resistance is reduced, and even in a high-power use of the battery, heat generation or the like does not occur, and energy loss can be reduced; thus, the porosity is preferably higher. However, too high a porosity reduces mechanical strength, and when the polyethylene microporous membrane is wound with electrodes for storage in a battery, the polyethylene microporous membrane may rupture to cause a defect; thus, the porosity of the polyethylene microporous membrane of the present invention is preferably not higher than 85%. Also, too low a porosity leads to poor permeability, and thus the porosity is preferably not lower than 15%. To achieve both permeability and strength to provide excellent battery properties, the porosity of the polyethylene microporous membrane of the present invention is more preferably 20 to 55%, and most preferably 25 to 50%.

Examples of the method of controlling the porosity of the polyethylene microporous membrane of the present invention within such a preferred range include adjusting the ratio of the first polyethylene to the second polyethylene in the polyethylene composition or the ratio of the polyethylene and/or polyethylene composition to a plasticizer within the range mentioned above. Further, by producing the polyethylene microporous membrane under the stretching conditions mentioned above, the porosity of the polyethylene microporous membrane of the present invention can be achieved.

(e) Thickness

The polyethylene microporous membrane of the present invention, in order to achieve both high permeability and excellent mechanical properties, preferably has a thickness of 2 to 100 μm. When the thickness of the microporous membrane is in this preferred range, during the production process and a subsequent processing process, the microporous membrane is unlikely to extend, unlikely to be wrinkled, excellent in processability, easy to handle, has sufficient strength, no risk of membrane rupture, not a low permeability, and is excellent in productivity. The thickness of the microporous membrane is more preferably 3 to 80 μm, still more preferably 4 to 50 μm, and most preferably 5 to 30 μm.

(f) Length in Width Direction

The polyethylene microporous membrane of the present invention has excellent planarity even when having a larger area, and thus has good planarity even if the length in the width direction is longer. The length in the width direction is not critical, but it is preferably 30 mm or more, more preferably 100 mm or more, still more preferably 300 mm or more, and most preferably 500 mm or more.

(g) Pin Puncture Strength

The pin puncture strength of the polyethylene microporous membrane is expressed as a maximum load measured when the polyethylene microporous membrane is pricked with a needle of 1 mm in diameter with a spherical end surface (radius R of curvature: 0.5 mm) at a speed of 2 mm/sec. To prevent a short circuit from occurring when the polyolefin microporous membrane is incorporated into a battery as a battery separator, the pin puncture strength of the polyethylene microporous membrane of the present invention is preferably 100 gf to 1,000 gf, more preferably 150 gf to 900 gf, and most preferably 200 gf to 800 gf.

(h) Tensile Strength

To prevent the polyethylene microporous membrane of the present invention from rupturing when the microporous membrane is used as a battery separator, and to improve handleability, the tensile strength of the polyethylene microporous membrane of the present invention is preferably 500 kgf/cm$^2$ to 4,000 kgf/cm$^2$ in both the longitudinal direction and the width direction. It is more preferably 750 to 3,500 kgf/cm$^2$, and most preferably 900 to 3,000 kgf/cm$^2$.

(i) Heat Shrinkage Rate

When the polyethylene microporous membrane of the present invention is used as a battery separator, to reduce the risk of internal short circuit when the temperature of the battery is elevated in case of trouble during production or use of the battery, the heat shrinkage rate of the polyethylene microporous membrane of the present invention after being held at 105° C. for 8 hours is preferably −5% to 10% in both the longitudinal direction and the width direction. Here, a shrinkage rate value below 0 indicates expansion. It is more preferably −3 to 8%, still more preferably −2 to 7.5%, and most preferably 0 to 7%.

[5] Methods of Measuring Physical Property Values

Next, methods of measuring physical property values of the polyethylene microporous membrane, as measured herein, will be described.

(a) Gurley Air Permeability

The Gurley air permeability was measured in accordance with JIS P 8117 (1998) at 23° C. and 65% RH (unit: sec/100 mL). For one test piece, the same measurement was made five times, and the average value of the Gurley air permeabilities obtained was defined as the Gurley air permeability of the test piece. Here, those whose average value of the Gurley air permeabilities was more than 1,000 sec/100 mL/25 μm were considered to have substantially no permeability, and evaluated as infinite (∞) sec/100 mL. Gurley air permeability converted to the value of a 25-μm-thick microporous membrane was calculated by the following equation.

$$\text{25-μm-converted Gurley air permeability} = 25 \times \text{measured Gurley air permeability of test piece (sec/100 mL)/sample thickness (μm)}$$

(b) Waviness Width in Width Direction (mm)

Figure 2:
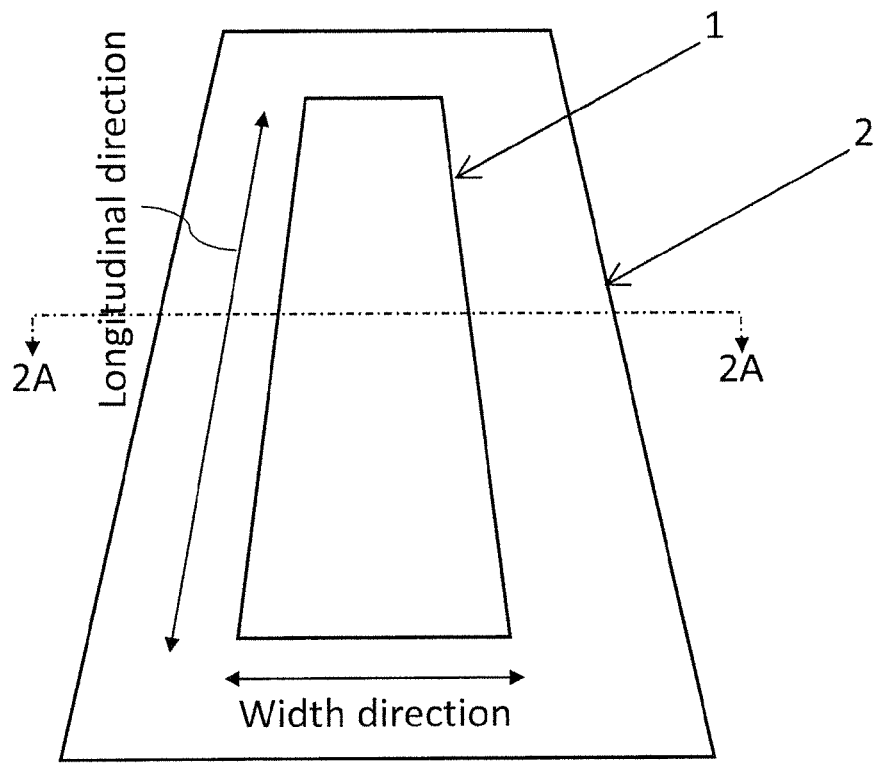
FIG. 2 is a drawing illustrating a method of measuring the waviness width in the width direction of the polyethylene microporous membrane of the present invention.
Figure 3:
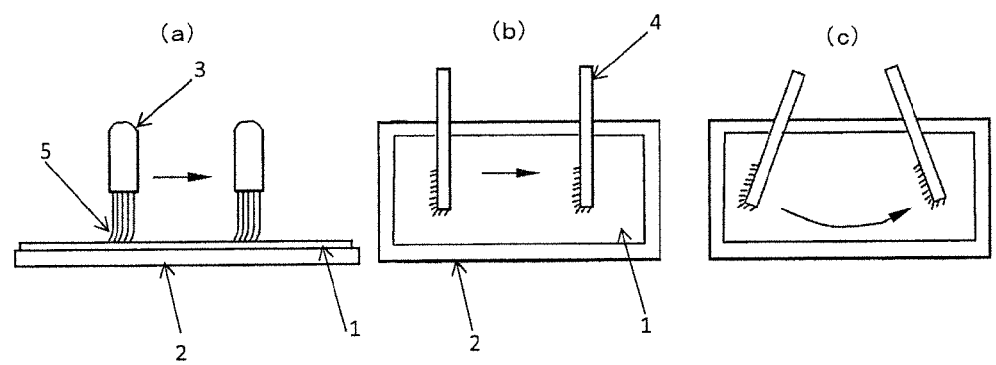
FIG. 3 is a schematic front view (FIG. 3a) and schematic plan views (FIG. 3b) and (FIG. 3c) illustrating a method of flattening a microporous membrane on a glass surface using an electrostatic brush in the method of measuring the waviness width in the width direction of the polyethylene microporous membrane of the present invention.
Figure 4:
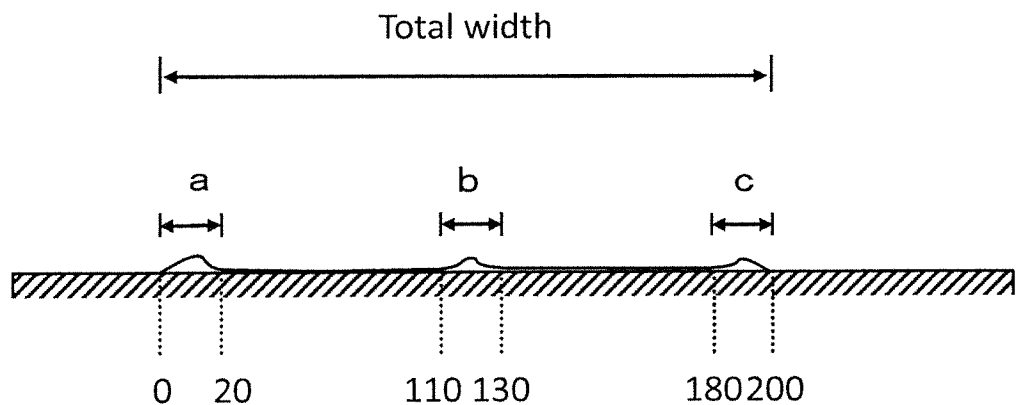
FIG. 4 is schematic view of a cross-section taken along the line 2A-2A of FIG. 2.

First, a method of measuring the waviness width in the width direction of a polyethylene microporous membrane will be described with reference to FIG. 2 to FIG. 4. First, a test piece 1 prepared by cutting a polyethylene microporous membrane to a size of 1 m in the longitudinal direction and 100 mm or more in the width direction is placed on a flat glass plate 2 as shown in FIG. 2. In the measurement of the waviness width in the present invention, the polyethylene microporous membrane is used after being stored in an environment of 23° C. and 50% humidity for at least 24 hours after it has been produced. The test piece 1 is then flattened using an electrostatic brush. The brush is used in such a manner that the brush is moved in parallel to the longitudinal direction (FIGS. 3a and 3b) such that a handle 4 of a brush 3 is parallel to the glass plate 2 and bristle ends 5 of the brush are in contact with the test piece 1 as shown in FIG. 3 to flatten the test piece 1. The handle of the brush 3 must not be slanted to the test piece 1. The angle α between the bristle ends 5 of the brush 3 and the test piece 1 is preferably 90° to 45°, and the bristle ends of the brush must not be bent excessively, or only a part of the bristle ends of the brush must not be in contact with the test piece. The brush 3 is preferably moved in a straight line, and it must not be moved curvedly or crookedly as shown in FIG. 3c.

Next, for waviness parts of the test piece 1 which are rising up above the glass plate 2, the length in the width direction is measured. The total length of waviness widths in the width direction of the polyethylene microporous membrane as used herein means the sum of the lengths of waviness widths in the width direction measured as described below. To explain the method of measuring the lengths of waviness widths in the width direction in detail, a schematic view of a cross-section taken along the line 2A-2A of FIG. 2 is shown in FIG. 4. For waviness parts a, b, and c of a test piece which are rising up above a glass plate, the waviness width is a length A from a starting point where the test piece starts to rise up to an end point where the test piece comes into contact with the glass plate again, and this definition is also applied to waviness widths B and C of b and c. In FIG. 4, for a test piece having a width of 200 mm, lengths are measured taking one end as 0 mm; a, b, and c are observed in the ranges of 0 mm to 20 mm, 110 mm to 130 mm, and 180 mm to 200 mm, respectively, and therefore, A=20 mm, B=20 mm, and C=20 mm. Thus, the total length of waviness widths in the width direction of the polyethylene microporous membrane is A+B+C. Therefore, the total length of waviness widths in the width direction of the microporous membrane in FIG. 4 is 60 mm. The measurement of the lengths of waviness widths were made in such a manner that the test piece 1 was measured in the longitudinal direction at 20-cm intervals, and the average value of the measurements of four points was defined as the total length of waviness widths in the width direction of the polyethylene microporous membrane in the present invention.

(c) Load Necessary to Remove Slack (g/mm$^2$)

Figure 5:
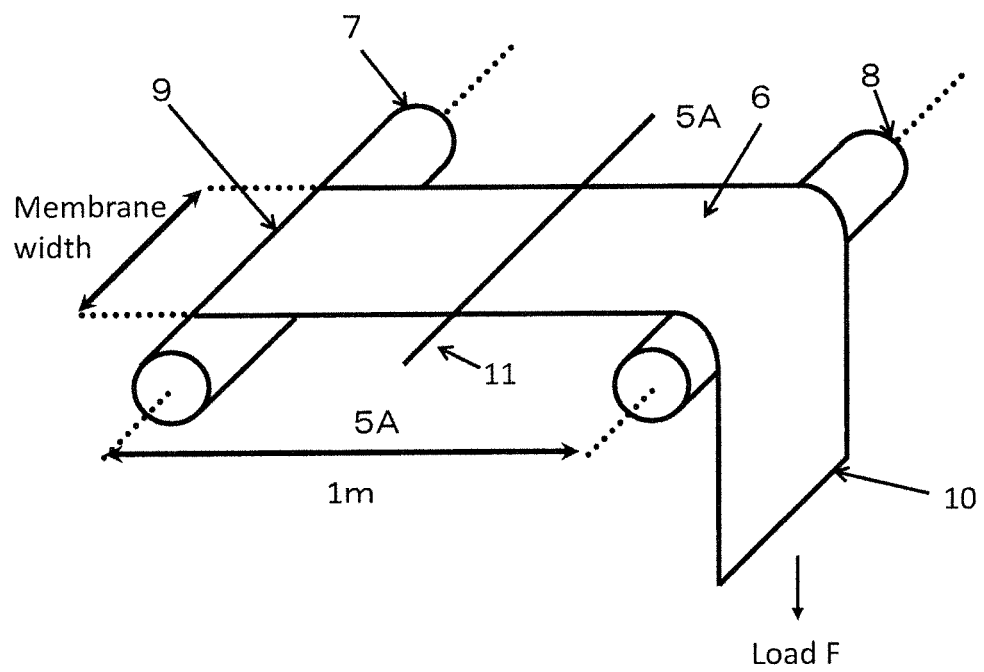
FIG. 5 is an overall schematic view of a measuring apparatus for measuring a load (g/mm²) necessary to remove slack.
Figure 6:
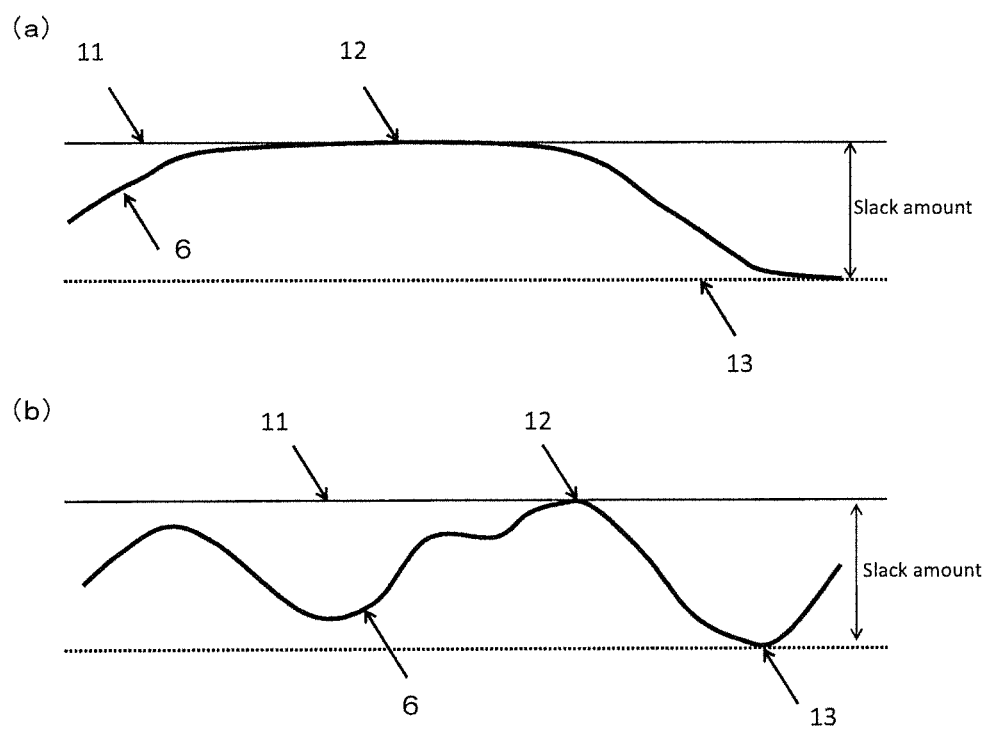
FIGS. 6a and 6b are schematic views of cross-sections taken along the line 5A-5A in FIG. 5.

The measurement of a load necessary to remove slack in the present invention is performed after a polyethylene microporous membrane is stored in an environment of 23° C. and 50% humidity for at least 24 hours. A method of measuring a load necessary to remove slack will be described with reference to FIG. 5 and FIG. 6. FIG. 5 is an overall schematic view of a measuring apparatus for measuring a load necessary to remove slack (g/mm$^2$). FIGS. 6a and 6b are schematic views of cross-sections taken along the line 5A-5A in FIG. 5. First, a polyethylene microporous membrane is cut in the longitudinal direction to 1 m or more to prepare a test piece 6. As shown in FIG. 5, the test piece 6 is placed over two rolls 7 and 8 with an interval of 1 m in between, and an end 9 of the test piece 6 is fixed uniformly in the width direction on the roll 7 using tape, a bar, or the like. An end 10 of the test piece 6 is located at the roll 8, or in the case where the test piece 6 is longer than 1 m, the end 10 is hung down vertically from the roll 8 and left still.

A thread 11 is strung between the roll 7 and the roll 8 such that it is parallel to the central axes of the rolls 7 and 8 and the distances from the roll 7 and the roll 8 are the same, and the level of the thread 11 is adjusted such that the thread 11 is in contact with a highest part 12 at the upper side of the test piece 6 as shown in FIGS. 6a and 6b. The distance between the highest part 12 at the upper side of the test piece in contact with the thread 11 and a lowest part 13 at the underside of the test piece which is farthest from the thread 11 is measured and defined as the amount of slack. Here, the opposite side of the test piece from the roll is defined as the upper side, and the roll side as the underside. Next, as shown in FIG. 5, a load is applied along the longitudinal direction of the test piece 6 and uniformly across the width of the test piece 6. Load F is increased, and load F'" per unit area (mm$^2$) at which the amount of slack falls below 1 mm is defined as the load necessary to remove slack in the present invention. The measurement is made at 25° C. and a humidity of 50% RH. In this measurement, if a load is kept applied for a long time, the test piece may be extended by the load, and a load at which slack is removed may vary. Thus, the measurement of load F is carried out in 30 seconds from the start of application of a load to the test piece to the end of the measurement.

(d) Porosity (%)

The porosity was calculated by the following equation from the mass ($W_1$) of a polyethylene microporous membrane and the mass ($W_2$) of a nonporous polyethylene membrane having the same volume comprising the same polyethylene resin as in the polyethylene microporous membrane.

$$\text{Porosity (\%)}=100\times(W_2-W_1)/W_2$$

(e) Pin Puncture Strength (gf)

The pin puncture strength is defined as a maximum load measured (in grams Force, or "gF") when a polyethylene microporous membrane having a thickness of $T_1$ is pricked with a needle of 1 mm in diameter with a spherical end surface (radius R of curvature: 0.5 mm) at a speed of 2 mm/sec.

(f) Heat Shrinkage Rate (%) at 105° C. in Longitudinal Direction/Width Direction A polyethylene microporous membrane is cut to a square of 9 cm in the longitudinal direction and 9 cm in the width direction to prepare a test piece. The test piece is marked at the middle point of each side. The distance between the middle points at the opposite sides is measured ($L_0$). The test piece is heat treated in a circulating hot air oven at 105° C. for 8 hours, and then taken out and left to stand at room temperature for 30 minutes. Similarly to before heat treatment, the distance between the middle points at the opposite sides is measured ($L_1$). The heat shrinkage rate was calculated by the following equation (unit: %).

$$\text{Heat shrinkage rate (\%)}=100\times(L_0-L_1)/L_0$$

For one microporous membrane, five different test pieces are prepared, and the same measurement is made for each test piece. The average value of the five measurements is defined as a 105° C. heat shrinkage rate.

(g) Thickness of Microporous Membrane (μm)

A polyethylene microporous membrane is cut to a square of 5 cm in the longitudinal direction and 5 cm in the width direction to prepare a test piece. The thickness of the polyethylene microporous membrane was measured at 1-cm longitudinal intervals over 5 cm using a contact thickness meter (RC-1 available from MAYSUN, Co. Ltd.). The thickness was measured also in the width direction in the same manner. For one polyethylene microporous membrane, ten test pieces were prepared and measured. The average value of the ten test pieces was defined as the thickness of the microporous membrane.

(h) Virtual Stretching Magnification

On an unstretched polyethylene microporous membrane extruded through a slit die, cast on a metal drum, and cooled to solidify into a sheet, squares with 1 cm sides were impressed such that each side was parallel to the longitudinal direction and the width direction of the polyethylene microporous membrane, and then the polyethylene microporous membrane was stretched and taken up. Lengths (cm) of the squares of the polyethylene microporous membrane obtained were measured for 10 squares in the longitudinal direction and 10 squares in the width direction, and average values of them were defined as virtual stretching magnifications in the longitudinal direction and the width direction, respectively.

(i) Membrane-Forming Properties

Evaluation was made according to the following criteria when a polyethylene microporous membrane was produced at a cast speed of 2 m/min for 5 hours.

A: No rupture occurred
B: Rupture occurred once
C: Rupture occurred twice
D: Rupture occurred three or more times (j) Coating Defects First, a coating layer is formed on a polyethylene microporous membrane as described below.

[Preparation of Slurry 1 and Slurry 2]

Polyvinylidene fluoride-chlorotrifluoroethylene copolymer (PVdF-CTFE) macromolecule in an amount of 5% by weight was added to acetone and then dissolved at a temperature of 50° C. for 12 hours or more to obtain a macromolecular solution. To the macromolecular solution, $BaTiO_3$ powder was added at a ratio $BaTiO_3$/PVdF-CTFE of 90/10 (% by weight), and the $BaTiO_3$ powder was pulverized and dispersed for 12 hours or more using a ball milling method to obtain a slurry 1. The slurry 1 thus obtained was pulverized to a $BaTiO_3$ particle size of 400 nm, which was controlled by the size (particle size) of beads used in the ball milling method and execution time of ball milling, to obtain a slurry 2.

[Preparation of Slurry 3]

$Al_2O_3$ powder is added into a solution of 10% by weight dimethyl methyl phosphonate (DMMP) in acetone and stirred at 25° C. for 24 hours for modification. Polyvinylene fluoride-chlorotrifluoroethylene copolymer (PVdF-CTFE) macromolecule in an amount of 5% by weight was added to acetone and then dissolved at 50° C. for 12 hours to produce a macromolecular solution. To the macromolecular solution, $Al_2O_3$ powder was added at a ratio of macromolecular solution:$Al_2O_3$=90:10 (weight ratio), and the $Al_2O_3$ powder was pulverized for 15 hours using a ball milling method to produce a slurry 3.

[Preparation of Slurry 4]

The same volume of the slurry 2 and the slurry 3 were mixed and thoroughly stirred to produce a slurry 4. The slurry 4 thus obtained was applied to a polyethylene microporous membrane using a dip coating method. The layer applied had a thickness of 3 μm.

Next, from the resulting polyethylene microporous membrane having a coating layer, a polyethylene microporous membrane with a length of 1 m was cut out and hung vertically in a darkroom. A lusterless black cloth was then disposed over the entire back surface of the microporous membrane, and using a three-band daylight fluorescent lamp (FL20SS EX-N/18P: available from Panasonic Corporation) from one side, the front surface of the polyethylene microporous membrane was observed with the angle of the fluorescent lamp to the polyethylene microporous membrane surface being varied in the range of about 10° to 45°. In an evaluation area of 1 m², coating streak defects with a length of 10 mm or more were detected and marked (If the evaluation area is 1 m², the width of the polyethylene microporous membrane may be less than 1 m).

The lengths of the streak defects were measured with a ruler put close to the polyethylene microporous membrane to the extent that it did not come into direct contact with the polyethylene microporous membrane. Further, the side opposite to the evaluation surface was illuminated using bromine light (VIDEO LIGHT VLG301, 100 V, 300 W, available from LPL Co., Ltd.) in the range of about 10° to 45° similarly to the above. The bromine light illuminated surface (the side opposite to the surface evaluated earlier) was observed, and coating streak defects were picked out and marked. At this time, the lusterless black cloth was disposed over the side opposite to an observer. Streaks located in the same line along the width direction of the polyethylene microporous membrane were counted as one streak, but streaks 100 mm or more away from each other were counted as separate streaks. For these marked areas including a coating streak defect, to distinguish the continuous coating streak defect as used herein from large coating streak defects which are formed in such a manner that particle aggregates existing in a coating solution are densely gathered on a macroporous membrane and scattered in streaks, the surface shape in a field of view of 1,664×1,248 μm was measured under the following measurement conditions using a noncontact three-dimensional shape-measuring apparatus TYPE550 manufactured by Micromap Corporation.

Measurement conditions: wave mode
Objective lens: 10×
0.5× zoom lens was used

Subsequently, in a contour display mode, an image in which a measuring plane was color-coded according to height was displayed. At this time, plane correction (four-dimensional function correction) was performed to remove undulations of surface shape. In the contour display mode, taking the average height in a measuring area as 0 nm, the maximum height and the minimum height were set at 100 nm and −100 nm, respectively, and projected areas with a height of 100 nm or more were displayed in red. Subsequently, the same measured field of view was displayed in a cross-sectional profile display mode. In a cross-section movement screen, a cursor was pinched at both ends and moved such that the cursor lied along the longitudinal direction of a projection, and the cursor passed through a maximum height position of the projection. In a plot screen, a height scale was adjusted so that the whole projection were displayed. In the plot screen, two cursors were placed at both ends of the projection, and the size (major axis) of the projection was read. Subsequently, one cursor was placed at the highest point of the projection, and the other cursor was placed at the height of 0 nm (the average height in the measuring area was 0 nm), to determine a projection height. Further, the measurement position was shifted along the extension of the measured streak (here, nuclei aligning within 0.5 mm in the width direction of a continuous coating streak was counted as nuclei in the same streak), and the above measurement was repeated until the determined length of the streak considered as the same reached 10 mm.

After the above measurement, coating streak defects in which defects having a nucleus that satisfies expression 1 and expression 2 below are stretching in a row while satisfying expression 3 and expression 4 below were judged to be a continuous coating streak defect, and the number of continuous coating streak defects per 1 m² of a microporous membrane was counted and defined as the number of continuous coating streak defects of the polyethylene microporous membrane.

$$10\ \mu m \leq Dd \leq 35\ \mu m \quad \text{Expression 1:}$$

$$100\ nm \leq Dt \leq 800\ nm \quad \text{Expression 2:}$$

$n \geq 2$      Expression 3:

$t \geq 10$      Expression 4:

Dd: Major axis of one nucleus in continuous defect portion

Dt: Maximum height of one nucleus in continuous defect portion n: The number of nuclei satisfying expression 1 and expression 2 per 1 mm of continuous coating streak defect t: Length of continuous coating streak defect The number of continuous coating streak defects of not more than 50/m² was evaluated as good, and the number of continuous coating streak defects of more than 50/m² as bad.

(k) Tensile Strength

The tensile strength of a polyethylene microporous membrane is measured in accordance with ASTM D882 (1997). An Instron-type tensile tester is used, and the conditions are as described below. The average value of five measurements is defined as the tensile strength in the present invention. Test pieces for measuring the tensile strength in the width direction were prepared by cutting a polyethylene microporous membrane to a rectangle of 10 mm in the longitudinal direction and 50 mm in the width direction (the distance between chucks to hold the microporous membrane was 20 mm). Test pieces for measuring the tensile strength in the longitudinal direction were prepared by cutting a polyethylene microporous membrane to a rectangle of 10 mm in the width direction and 50 mm in the longitudinal direction (the distance between chucks to hold the microporous membrane was 20 mm). The measurements were made at a tensile speed of 100 mm/min in an environment of temperature 23° C. and humidity 65% RH.

(l) Evaluation of Biaxial Orientation

The state of orientation of a polyethylene microporous membrane was evaluated using an X-ray diffraction photograph taken when X-rays were incident upon the polyethylene microporous membrane from three directions described below.

Through incidence: Incident normal to the surface formed by the longitudinal direction and the width direction of a polyethylene microporous membrane.

End incidence: Incident normal to the surface formed by the width direction and the thickness direction of a polyethylene porous membrane.

Edge incidence: Incident normal to the surface formed by the longitudinal direction and the thickness direction of a polyethylene microporous membrane.

A test piece was prepared by laminating polyethylene microporous membranes such that their longitudinal directions and their width directions respectively corresponded with each other to a thickness of about 1 mm and cutting the laminate, and measured.

The X-ray diffraction photographs were measured by an imaging plate method under the following conditions.

X-ray generator: Model 4036A2 manufactured by Rigaku Denki Co., Ltd. (currently, Rigaku Corporation)

X-ray source: CuKα ray (Ni filter was used)

Slit system: 1 mmϕ pinhole collimator

Imaging plate: FUJIFILM BAS-SR

Photographing conditions: Camera radius (distance between sample and imaging plate): 40 mm, and exposure time: 5 min Here, the polyethylene microporous membrane was evaluated to be non-oriented, uniaxially oriented, or biaxially oriented according to the following criteria, as explained in, for example, Kiyokazu Matsumoto et al., "Journal of Fiber Science and Technology, Japan", Vol. 26, No. 12, 1970, pp. 537 to 549; Kiyokazu Matsumoto, "Making Microporous Membrane", Kyoritsu Shuppan (1993), pp. 67 to 86; Seizo Okamura et al., "Kobunshi Kagaku Joron (Polymer Chemistry Introduction) (second edition)", Kagaku-Dojin Publishing Co., Inc. (1981), pp. 92 to 93; and the like.

Non-oriented: Debye-Scherrer ring of substantially equal intensity is observed in X-ray diffraction photographs of every direction.

Uniaxially oriented in longitudinal direction: Debye-Scherrer ring of substantially equal intensity is observed in X-ray diffraction photograph of End incidence.

Biaxially oriented: Diffraction pattern of unequal diffraction intensity reflecting each direction is observed in X-ray diffraction photographs of every direction.

EXAMPLES

The present invention will now be described by way of example. Unless otherwise noted, the extrusion rate of polymer was adjusted to a predetermined value to produce a polyethylene microporous membrane with a desired thickness.

Example 1

A polyethylene composition comprising 40% by weight of ultra-high molecular weight polyethylene (UHMWPE) having a Mw of $2.0 \times 10^6$, a Mw/Mn of 5, a melting point of 135° C., and a crystal dispersion temperature of 90° C. and 60% by weight of high-density polyethylene (HDPE) having a weight average molecular weight (Mw) of $5.6 \times 10^5$, a molecular weight distribution (Mw/Mn) of 4.1, a melting point of 135° C., a crystal dispersion temperature of 90° C., and a terminal vinyl group content of 0.1 per 10,000 carbon atoms was prepared. The polyethylene composition had a melting point (Tm) of 135° C. and a crystal dispersion temperature (Tcd) of 90° C.

The Mw and Mw/Mn of UHMWPE and HDPE were determined by gel permeation chromatography (GPC) under the following conditions according to the method described in Macromolecules, Vol. 34, No. 19, pp. 6,812 to 6,820 (2001), and so on.

Measuring apparatus: PL-GPC220 available from Polymer Laboratories

Column: Three PLgel Mixed-B Columns available from Polymer Laboratories

Column temperature: 145° C.

Solvent (mobile phase): 1,2,4-trichlorobenzene (available from Aldrich, containing about 1,000 ppm of butylated hydroxytoluene)

Solvent flow rate: 0.5 mL/min

Sample concentration: 0.25 to 0.75 mg/mL (dissolution conditions: 160° C./2 hr)

Injection amount: 300 μL

Detector: Differential refractometer

Calibration curve: Generated from a calibration curve of a monodisperse polystyrene standard sample using a predetermined conversion factor.

The polyethylene composition was charged into a twin-screw extruder in an amount of 25% by weight, and liquid paraffin [50 cst (40° C.)] was fed to the twin-screw extruder via a side feeder in an amount of 75% by weight. Melt blending was performed under the conditions of 210° C. and 350 rpm to prepare a polyethylene solution. The polyethylene solution was extruded through a T-die provided on the twin-screw extruder and cooled by taking it up around a cooling roll controlled at 40° C. to form a gel-like sheet. The gel-like sheet obtained was simultaneously biaxially stretched at 120° C. to 5 times in both the longitudinal direction and the width direction using a tenter stretching machine, and, while being fixed to the tenter stretching apparatus as it was so that a dimensional change did not occur either in the longitudinal or width direction, heat set at a temperature of 120° C. for 10 seconds (first-stage stretching/heat setting).

The stretched gel-like sheet was then immersed in a bath of methylene chloride to remove liquid paraffin and washed to obtain a polyethylene microporous membrane, which was air-dried. The polyethylene microporous membrane obtained was re-stretched at 125° C. to 1.5 times in the width direction using the tenter stretching apparatus, and then, while being fixed to the tenter stretching apparatus as it was so that a dimensional change did not occur either in the longitudinal or width direction, heat set at a temperature of 130° C. for 20 seconds (second-stage stretching/heat setting).

After the second-stage heat setting, the polyethylene microporous membrane was conveyed onto two rolls heated to 90° C. and heat-relaxed by utilizing a difference in peripheral speed between the rolls. In the heat-relaxing using rolls, the peripheral speed of the roll near a winder was set slower than the peripheral speed of the roll near an extruder, and between the rolls, the microporous membrane was relaxed in the longitudinal direction at a relaxation rate of 0.1% and a relaxation speed in the longitudinal direction of 0.8%/sec (heat-relaxing).

The polyethylene microporous membrane was then cooled to room temperature and taken up with a roll to produce a polyethylene microporous membrane having a thickness of 9 μm and a width of 300 mm.

Examples 2 to 6

A polyethylene microporous membrane was produced in the same manner as in Example 1 except that the relaxation rate in the longitudinal direction in the heat-relaxing was changed as shown in Table 1 and Table 2, and evaluated.

Example 7

A polyethylene microporous membrane was produced in the same manner as in Example 1 except that the relaxation rate in the longitudinal direction in membrane width was changed as shown in Table 1 and Table 2 and the membrane width was changed as shown in Table 2, and evaluated.

Examples 8, 9

A polyethylene microporous membrane was produced in the same manner as in Example 1 except that the relaxation temperature in the heat-relaxing was changed as shown in Table 1 and Table 2 and the relaxation speed in the longitudinal direction was changed to 0.3%/sec, and evaluated.

Example 10

A polyethylene composition comprising 2% by weight of the same ultra-high molecular weight polyethylene (UHMWPE) as in Example 1 and 98% by weight of the same high-density polyethylene (HDPE) as in Example 1 was prepared. The polyethylene composition had a melting point (Tm) of 135° C. and a crystal dispersion temperature (Tcd) of 90° C.

The polyethylene composition was charged into a twin-screw extruder in an amount of 40% by weight, and liquid paraffin [50 cst (40° C.)] was fed to the twin-screw extruder via a side feeder in an amount of 60% by weight. Melt blending was performed under the conditions of 210° C. and 350 rpm to prepare a polyethylene solution. The polyethylene solution was extruded through a T-die provided on the twin-screw extruder and cooled by taking it up around a cooling roll controlled at 40° C. to form a gel-like sheet. The gel-like sheet obtained was simultaneously biaxially stretched at 120° C. to 5 times in both the longitudinal direction and the width direction using a tenter stretching machine, and, while being fixed to the tenter stretching apparatus as it was so that a dimensional change did not occur either in the longitudinal or width direction, heat set at a temperature of 120° C. for 10 seconds (first-stage stretching/heat setting).

The stretched gel-like sheet was then immersed in a bath of methylene chloride to remove liquid paraffin and washed to obtain a polyethylene microporous membrane, which was air-dried. The polyethylene microporous membrane obtained was re-stretched at 125° C. to 1.4 times in the width direction using the tenter stretching apparatus, and then, while being fixed to the tenter stretching apparatus as it was so that a dimensional change did not occur either in the longitudinal or width direction, heat set at a temperature of 130° C. for 30 seconds (second-stage stretching/heat setting).

After the heat setting, the polyethylene microporous membrane was relaxed in the longitudinal direction at a relaxation rate of 1.5% in the same manner as in Example 3.

The polyethylene microporous membrane was then cooled to room temperature and taken up with a roll to produce a polyethylene microporous membrane having a thickness of 20 μm and a width of 300 mm.

Example 11

A polyethylene composition comprising 30% by weight of the same ultra-high molecular weight polyethylene (UHMWPE) as in Example 1 and 70% by weight of the same high-density polyethylene (HDPE) as in Example 1 was prepared. The polyethylene composition had a melting point (Tm) of 135° C. and a crystal dispersion temperature (Tcd) of 90° C.

The polyethylene composition was charged into a twin-screw extruder in an amount of 28% by weight, and liquid paraffin [50 cst (40° C.)] was fed to the twin-screw extruder via a side feeder in an amount of 72% by weight. Melt blending was performed under the conditions of 210° C. and 350 rpm to prepare a polyethylene solution. The polyethylene solution was extruded through a T-die provided on the twin-screw extruder and cooled by taking it up around a cooling roll controlled at 40° C. to form a gel-like sheet. The gel-like sheet obtained was simultaneously biaxially stretched at 120° C. to 7 times in both the longitudinal direction and the width direction using a tenter stretching machine, and, while being fixed to the tenter stretching apparatus as it was so that a dimensional change did not occur either in the longitudinal or width direction, heat set at a temperature of 120° C. for 10 seconds (first-stage stretching/heat setting).

The stretched gel-like sheet was then immersed in a bath of methylene chloride to remove liquid paraffin and washed to obtain a polyethylene microporous membrane, which was air-dried. The polyethylene microporous membrane obtained was re-stretched at 130° C. to 1.4 times in the width direction using the tenter stretching apparatus, and then, while being fixed to the tenter stretching apparatus as it was so that a dimensional change did not occur either in the longitudinal or width direction, heat set at a temperature of 130° C. for 20 seconds (second-stage stretching/heat setting).

The polyethylene microporous membrane was then relaxed in the width direction at 90° C. and a relaxation rate of 15% using the tenter apparatus (first-stage heat-relaxing). Thereafter, in the same manner as in Example 1, the polyethylene microporous membrane was conveyed onto two rolls heated to 90° C. and subjected to the heat-relaxing using rolls. Between the rolls, the microporous membrane was relaxed in the longitudinal direction at a relaxation rate of 1.5% and a relaxation speed in the longitudinal direction of 0.5%/sec (second-stage heat-relaxing).

The microporous membrane was then cooled to room temperature and taken up with a roll to produce a polyethylene microporous membrane having a thickness of 12 μm and a width of 300 mm.

Example 12

A polyethylene microporous membrane was produced in the same manner as in Example 11 except that as shown in Table 1 and Table 2, in the first-stage heat-relaxing, the polyethylene microporous membrane was relaxed in the longitudinal direction at a relaxation rate of 1.5% and a relaxation speed in the longitudinal direction of 0.5%/sec utilizing a difference in peripheral speed between two rolls heated to 100° C.; the second-stage heat-relaxing was not performed; and the polyethylene microporous membrane produced had a thickness of 9 mm and a width of 300 mm.

Example 13

A polyethylene microporous membrane was produced in the same manner as in Example 1 except that as shown in Table 1 and Table 2, after the second-stage heat setting, the first-stage and the second-stage heat-relaxing were performed using a linear motor tenter apparatus; the first-stage heat-relaxing was performed in the width direction at a relaxation temperature of 90° C. and a relaxation rate of 15%; and the second-stage heat-relaxing was performed in the longitudinal direction at a relaxation temperature of 90° C., a relaxation rate of 5%, and a relaxation speed in the longitudinal direction of 0.3%/sec.

Examples 14 to 19

A polyethylene microporous membrane was produced in the same manner as in Example 11 except that the production conditions were changed as shown in Table 1, Table 2, and Table 3, and evaluated.

Comparative Example 1

A polyethylene microporous membrane was produced in the same manner as in Example 1 except that the relaxing in the longitudinal direction was not performed as shown in Table 1 and Table 2.

Comparative Example 2

A polyethylene microporous membrane was produced in the same manner as in Example 1 except that as shown in Table 1 and Table 2, the second-stage stretching was performed at a stretching temperature of 130° C. and a magnification in the width direction of 1.4, and the heat-relaxing was performed at a roll temperature of 35° C., a relaxation rate in the longitudinal direction of 1.5%, and a relaxation speed in the longitudinal direction of 0.8%/sec.

The production conditions of Examples 1 to 19 and Comparative Examples 1 and 2 are shown in Table 1 and Table 2.

The evaluation results of physical properties of the polyethylene microporous membranes obtained in Examples 1 to 19 and Comparative Examples 1 and 2 are shown in Table 3. The polyethylene microporous membranes obtained in Examples 1 to 19 and Comparative Examples 1 and 2 were all biaxially-oriented.

TABLE 1

| | | | | 1st step Stretching · Heat setting conditions | | | | 2nd step Stretching · Heat setting conditions | | | |
|---|---|---|---|---|---|---|---|---|---|---|---|
| | UHMWPE content (wt %) | HDPE content (wt %) | PE resin composition concentration in solution (wt %) | Stretching method | Temperature (° C.) | Magnification (Longitudinal direction x Width direction) | Heat setting temperature (° C.) | Stretching method | Stretching temperature (° C.) | Magnification (Width direction) | Heat setting temperature (° C.) |
| Example 1 | 40 | 60 | 25 | Tentering method | 120 | 5 × 5 | 120 | Tentering method | 125 | 1.5 | 130 |
| Example 2 | 40 | 60 | 25 | | 120 | 5 × 5 | 120 | | 125 | 1.5 | 130 |
| Example 3 | 40 | 60 | 25 | | 120 | 5 × 5 | 120 | | 125 | 1.5 | 130 |
| Example 4 | 40 | 60 | 25 | | 120 | 5 × 5 | 120 | | 125 | 1.5 | 130 |
| Example 5 | 40 | 60 | 25 | | 120 | 5 × 5 | 120 | | 125 | 1.5 | 130 |
| Example 6 | 40 | 60 | 25 | | 120 | 5 × 5 | 120 | | 125 | 1.5 | 130 |
| Example 7 | 40 | 60 | 25 | | 120 | 5 × 5 | 120 | | 125 | 1.5 | 130 |
| Example 8 | 40 | 60 | 25 | | 120 | 5 × 5 | 120 | | 125 | 1.5 | 130 |
| Example 9 | 40 | 60 | 25 | | 120 | 5 × 5 | 120 | | 125 | 1.5 | 130 |
| Example 10 | 2 | 98 | 40 | | 120 | 5 × 5 | 120 | | 125 | 1.4 | 130 |
| Example 11 | 30 | 70 | 28 | | 120 | 7 × 7 | 120 | | 130 | 1.4 | 130 |
| Example 12 | 30 | 70 | 28 | | 120 | 7 × 7 | 120 | | 130 | 1.4 | 130 |
| Example 13 | 40 | 60 | 25 | | 120 | 5 × 5 | 120 | | 125 | 1.5 | 130 |
| Example 14 | 18 | 82 | 30 | | 115 | 5 × 5 | 122 | | 125 | 1.5 | 130 |
| Example 15 | 18 | 82 | 30 | | 115 | 5 × 5 | 122 | | 125 | 1.5 | 130 |
| Example 16 | 18 | 82 | 30 | | 115 | 5 × 5 | 122 | | 125 | 1.5 | 130 |
| Example 17 | 18 | 82 | 30 | | 118 | 5 × 5 | 122 | | 125 | 1.6 | 129 |
| Example 18 | 18 | 82 | 30 | | 118 | 5 × 5 | 122 | | 125 | 1.6 | 128 |
| Example 19 | 18 | 82 | 30 | | 115 | 5 × 5 | 122 | | 125 | 1.5 | 130 |
| Comparative Example 1 | 40 | 60 | 25 | | 120 | 5 × 5 | 120 | | 125 | 1.5 | 130 |
| Comparative Example 2 | 40 | 60 | 25 | | 120 | 5 × 5 | 120 | | 130 | 1.4 | 130 |

TABLE 2

| | Heat-relaxing 1 | | | | | Heat-relaxing 2 | | | | |
|---|---|---|---|---|---|---|---|---|---|---|
| | Heat-relaxing method | Temperature (°C.) | Across-the-width relaxation ratio (%) | Longitudinal relaxation ratio (%) | Longitudinal relaxation speed (%/sec) | Heat-relaxing method | Temperature (°C.) | Across-the-width relaxation ratio (%) | Longitudinal relaxation ratio (%) | Longitudinal relaxation speed (%/sec) |
| Example 1 | Roll method | 90 | 0 | 0.1 | 0.8 | — | — | — | — | — |
| Example 2 | Roll method | 90 | 0 | 0.8 | 0.8 | — | — | — | — | — |
| Example 3 | Roll method | 90 | 0 | 1.5 | 0.8 | — | — | — | — | — |
| Example 4 | Roll method | 90 | 0 | 1.9 | 0.8 | — | — | — | — | — |
| Example 5 | Roll method | 90 | 0 | 3 | 0.8 | — | — | — | — | — |
| Example 6 | Roll method | 90 | 0 | 5 | 0.8 | — | — | — | — | — |
| Example 7 | Roll method | 90 | 0 | 1.5 | 0.8 | — | — | — | — | — |
| Example 8 | Roll method | 95 | 0 | 1.5 | 0.3 | — | — | — | — | — |
| Example 9 | Roll method | 60 | 0 | 1.5 | 0.3 | — | — | — | — | — |
| Example 10 | Roll method | 90 | 0 | 1.5 | 0.8 | — | — | — | — | — |
| Example 11 | Tentering method | 90 | 15 | 0 | — | Roll method | 90 | 0 | 1.5 | 0.5 |
| Example 12 | Roll method | 100 | 0 | 1.5 | 0.5 | — | — | — | — | — |
| Example 13 | Tentering method | 90 | 15 | 0 | — | Tentering method | 90 | 0 | 5 | 0.3 |
| Example 14 | Tentering method | 110 | 10 | 0 | — | Roll method | 90 | 0 | 1.5 | 0.8 |
| Example 15 | Tentering method | 110 | 10 | 0 | — | Roll method | 90 | 0 | 1.5 | 0.8 |
| Example 16 | Tentering method | 110 | 10 | 0 | — | Roll method | 90 | 0 | 1.5 | 0.8 |
| Example 17 | Tentering method | 110 | 5 | 0 | — | Roll method | 90 | 0 | 1.5 | 0.8 |
| Example 18 | Tentering method | 110 | 5 | 0 | — | Roll method | 90 | 0 | 1.5 | 0.8 |
| Example 19 | Tentering method | 110 | 10 | 0 | — | Roll method | 90 | 0 | 1.5 | 0.8 |
| Comparative Example 1 | — | — | — | — | — | — | — | — | — | — |
| Comparative Example 2 | Roll method | 35 | 0 | 1.5 | 0.8 | — | — | — | — | — |

TABLE 3

| | Microporous membrane properties | | | | | | | | | | | |
|---|---|---|---|---|---|---|---|---|---|---|---|---|
| | Membrane width (mm) | Membrane thickness (μm) | Porosity (%) | Gurley air permeability (sec/100 ml/25 μm) | Longitudinal tensile strength (kgf/cm²) | Across-the-width tensile strength (kgf/cm²) | Pin pucture strength (gf) | Heat shrinkage ratio Longitudinal (%)/Width (%) | Waviness width (mm) | Waviness width/Total width | Required load to remove slack (g/mm²) | Coating Defect | Film-forming processability |
| Example 1 | 300 | 9 | 44 | 306 | 1800 | 2100 | 350 | 6.5/3 | 90 | 0.30 | 100 | good | A |
| Example 2 | 300 | 9 | 42 | 311 | 1700 | 2100 | 350 | 6/3 | 30 | 0.10 | 40 | good | A |
| Example 3 | 300 | 9 | 40 | 333 | 1700 | 2100 | 380 | 6/3 | 25 | 0.08 | 30 | good | A |
| Example 4 | 300 | 9 | 39 | 361 | 1500 | 2200 | 400 | 5.5/3 | 30 | 0.10 | 40 | good | A |
| Example 5 | 300 | 9 | 34 | 444 | 1500 | 2500 | 400 | 5.5/3 | 60 | 0.20 | 80 | good | A |
| Example 6 | 300 | 9 | 36 | 417 | 1400 | 2400 | 350 | 4/3 | 85 | 0.28 | 130 | good | A |
| Example 7 | 1100 | 9 | 40 | 333 | 1600 | 2000 | 380 | 6/3 | 92 | 0.08 | 30 | good | A |
| Example 8 | 300 | 9 | 38 | 361 | 1500 | 2000 | 390 | 6/3 | 55 | 0.18 | 50 | good | A |
| Example 9 | 300 | 9 | 47 | 250 | 1500 | 2000 | 300 | 6/3 | 100 | 0.33 | 150 | good | A |
| Example 10 | 300 | 20 | 45 | 288 | 1000 | 1400 | 200 | 1.5/2.5 | 40 | 0.13 | 110 | good | A |
| Example 11 | 300 | 12 | 32 | 521 | 1900 | 1700 | 290 | 8/1 | 30 | 0.10 | 80 | good | A |
| Example 12 | 300 | 9 | 35 | 417 | 1200 | 2000 | 350 | 6/4 | 40 | 0.13 | 80 | good | A |
| Example 13 | 300 | 9 | 30 | 556 | 2000 | 1900 | 500 | 4/0.5 | 80 | 0.27 | 110 | good | A |
| Example 14 | 500 | 5 | 33 | 700 | 1300 | 1900 | 320 | 3.5/2.5 | 20 | 0.04 | 20 | good | A |
| Example 15 | 500 | 7 | 33 | 500 | 1300 | 1900 | 320 | 3.5/2.5 | 20 | 0.04 | 20 | good | A |
| Example 16 | 500 | 9 | 33 | 390 | 1300 | 1900 | 320 | 3.5/2.5 | 20 | 0.04 | 20 | good | A |
| Example 17 | 500 | 9 | 38 | 220 | 1600 | 2200 | 300 | 5.5/3.5 | 20 | 0.04 | 20 | good | A |
| Example 18 | 500 | 9 | 35 | 280 | 1600 | 2200 | 300 | 5.5/3.5 | 20 | 0.04 | 20 | good | A |
| Example 19 | 750 | 9 | 33 | 390 | 1300 | 1900 | 320 | 3.5/2.5 | 30 | 0.04 | 20 | good | A |
| Comparative Example 1 | 300 | 9 | 45 | 298 | 1800 | 2100 | 300 | 7/3 | 250 | 0.83 | 200 | bad | A |
| Comparative Example 2 | 300 | 9 | 35 | 521 | 1500 | 2500 | 320 | 6.5/3 | 180 | 0.60 | 160 | bad | A |

The polyethylene microporous membranes obtained in Examples 1 to 19, as compared to the polyethylene microporous membranes obtained in the Comparative Examples 1 and 2, had excellent permeability, a small waviness width, and a small load necessary to remove slack without compromising important physical properties such as heat shrinkage rate. Further, the polyethylene microporous membranes obtained in Examples 1 to 19 had few coating defects and showed excellent coating properties.

INDUSTRIAL APPLICABILITY

The polyethylene microporous membrane of the present invention is excellent in absorbency and liquid retention since it has excellent planarity without compromising important physical properties such as permeability. Thus, the polyethylene microporous membrane of the present invention can be used in packaging applications, industrial applications, and the like: for example, synthetic papers, heat-sensitive receiving papers, optical materials, building materials, separation membranes (filters), moisture-permeable waterproof materials such as wound covering materials, moisture-permeable waterproof cloths for garments and the like, absorbent articles for diapers, sanitary goods, and the like, ink receiving papers, absorbent materials for oils or fats, blood glucose level sensors, protein separation membranes, and the like. In particular, the polyethylene microporous membrane of the present invention can be most suitably used as a battery separator.

DESCRIPTION OF SYMBOLS

1: Test piece (polyethylene microporous membrane)
2: Glass plate
3: Brush
4: Handle of brush
5: Bristle ends of brush
6: Test piece (polyethylene microporous membrane)
7, 8: Roll
9, 10: End of test piece
11: Thread
12: Highest part of test piece
13: Lowest part of test piece

The invention claimed is:

1. A polyethylene microporous membrane having a Gurley air permeability of 1 to 1,000 sec/100 mL/25 μm and a total length of waviness widths in a width direction of the polyethylene microporous membrane is not more than one-third of an overall width of the microporous membrane, wherein the waviness widths are defined as portions of the microporous membrane, when the microporous membrane is placed on a flat surface, that are elevated off of the surface and lengths of waviness widths are lengths of those elevated portions measured relative to the width of the microporous membrane.

2. The polyethylene microporous membrane according to claim 1, wherein a load necessary to remove slack is 0 to 300 g/mm$^2$.

3. The polyethylene microporous membrane according to claim 2, having a porosity of 15 to 85%.

4. The polyethylene microporous membrane according to claim 1, having a porosity of 15 to 85%.

5. A composite membrane obtained by providing a coating layer on at least one surface of the polyethylene microporous membrane according to claim 1.

6. A battery comprising as a separator the polyethylene microporous membrane according to claim 1.

7. A composite membrane obtained by providing a coating layer on at least one surface of the polyethylene microporous membrane according to claim 2.

8. A composite membrane obtained by providing a coating layer on at least one surface of the polyethylene microporous membrane according to claim 4.

9. A battery comprising as a separator the composite membrane according to claim 5.

10. A process of producing the polyethylene microporous membrane according to claim 1, comprising:
    (a) preparing a polyethylene solution by heat-dissolving polyethylene or a polyethylene composition in a solvent;
    (b) extruding the solution of polyethylene or polyethylene composition through a die to form an extrudate;
    (c) cooling the extrudate to form a gel-like sheet;
    (d) stretching the gel-like sheet;
    (e) removing the solvent from the stretched gel-like sheet to obtain a microporous membrane;
    (f) stretching the microporous membrane from which the solvent has been removed; and
    (g) following (f), heat-relaxing the microporous membrane at least in the longitudinal direction at a temperature equal to or higher than 50° C., wherein the heat-relaxing is performed by utilizing a difference in peripheral speed between rolls.

11. The process according to claim 10, wherein a relaxation rate in the heat-relaxing is more than 0% but not more than 30% in the longitudinal direction.

12. A process of producing the polyethylene microporous membrane according to claim 2, comprising:
    (a) preparing a polyethylene solution by heat-dissolving polyethylene or a polyethylene composition in a solvent;
    (b) extruding the solution of polyethylene or polyethylene composition through a die to form an extrudate;
    (c) cooling the extrudate to form a gel-like sheet;
    (d) stretching the gel-like sheet;
    (e) removing the solvent from the stretched gel-like sheet to obtain a microporous membrane;
    (f) stretching the microporous membrane from which the solvent has been removed; and
    (g) following (f), heat-relaxing the microporous membrane at least in the longitudinal direction at a temperature equal to or higher than 50° C.

13. A process of producing the polyethylene microporous membrane according to claim 4, comprising:
    (a) preparing a polyethylene solution by heat-dissolving polyethylene or a polyethylene composition in a solvent;
    (b) extruding the solution of polyethylene or polyethylene composition through a die to form an extrudate;
    (c) cooling the extrudate to form a gel-like sheet;
    (d) stretching the gel-like sheet;
    (e) removing the solvent from the stretched gel-like sheet to obtain a microporous membrane;
    (f) stretching the microporous membrane from which the solvent has been removed; and
    (g) following (f), heat-relaxing the microporous membrane at least in the longitudinal direction at a temperature equal to or higher than 50° C.

14. A process of producing the polyethylene microporous membrane according to claim 5, comprising:
    (a) preparing a polyethylene solution by heat-dissolving polyethylene or a polyethylene composition in a solvent;

(b) extruding the solution of polyethylene or polyethylene composition through a die to form an extrudate;
(c) cooling the extrudate to form a gel-like sheet;
(d) stretching the gel-like sheet;
(e) removing the solvent from the stretched gel-like sheet to obtain a microporous membrane;
(f) stretching the microporous membrane from which the solvent has been removed; and
(g) following (f), heat-relaxing the microporous membrane at least in the longitudinal direction at a temperature equal to or higher than 50° C.

* * * * *